(12) United States Patent
Sakoda

(10) Patent No.: US 6,347,120 B1
(45) Date of Patent: Feb. 12, 2002

(54) COMMUNICATION METHOD, TRANSMITTER, RECEIVER, AND CELLULAR RADIO COMMUNICATION SYSTEM

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/128,743

(22) Filed: Aug. 4, 1998

(30) Foreign Application Priority Data

Aug. 7, 1997 (JP) .............................................. 9-213733

(51) Int. Cl.[7] .............................................. H04L 27/00
(52) U.S. Cl. ........................ 375/259; 375/268; 455/45; 455/59; 455/60
(58) Field of Search ................................ 375/259, 260; 455/45, 59, 60; 370/528, 529

(56) References Cited

U.S. PATENT DOCUMENTS 6,195,534 B1 * 2/2001 Sakoda et al. ................. 455/45

FOREIGN PATENT DOCUMENTS

EP 0892509 * 1/1999 ............ H04B/7/26

* cited by examiner

Primary Examiner—Mohammad H. Ghayour
(74) Attorney, Agent, or Firm—Jay H. Maioli

(57) ABSTRACT

A communication method, transmitter, receiver, and cellular ratio communication system. When the high priority data and the low priority data are transmitted at the same time in the multi-carrier communication, a processing in accordance with the priority is performed to decode data accurately. At the transmitting side, the high priority symbols and the low priority symbols are alternately positioned and each symbol of the differential symbol stream obtained by differential-modulating the high priority data based on the differential phase is assigned to sub-carrier. The transmission signal in which the sub-carriers on which high priority symbols are superimposed and the sub-carriers on which low priority symbols are superimposed are positioned alternately is transmitted. At the receiving side, when the transmission signal is received at a reception timing having transfer delay, the phase offset component is detected from the high priority symbol of the symbol stream obtained by performing a predetermined reception processing and the differential demodulation on the reception signal, and the high priority data is decoded. After the phase offset component is removed from the phase component of the low priority symbol of the symbol stream, the low priority data is decoded.

28 Claims, 14 Drawing Sheets

θ1 : phase for information
θ2 : phase offset component

COMMUNICATION METHOD, TRANSMITTER, RECEIVER, AND CELLULAR RADIO COMMUNICATION SYSTEM

BACKGROUND OF THE INVENTION

1. Field of the Invention

This invention relates to a communication method, a transmitter, a receiver, and a cellular radio communication system, and more particularly, is applicable to a portable telephone system.

2. Description of the Related Art

In the field of radio communication, a combination of high priority data and low priority data is generally transmitted. Such a typical digital radio communication system that a combination of high priority data and low priority data is transmitted will be explained below. However, in the explanation described below, one frame of transmission data is composed of the high priority data and the low priority data, and the transmission data for one frame is transmitted by one transmission slot. Note that "frame" means data units when processing digital data, and "slot" means data units when transmitting digital data.

In this radio communication system, as shown in FIG. 1, two types of information are transmitted by one frame. Accordingly, one frame is divided into high priority field and low priority field. The high priority data is stored in the high priority field and the low priority data is stored in the low priority field. In this case, not only the information bits of the data to be transmitted, but also error detection and correction bits are stored in each field. Thereby, the receiving side can detect and correct the errors of the received information bits by using the error detection and correction bits.

In addition, the error detection and correction bits having a superior ability to detect and correct errors are generally added to the high priority data, and the error detection and correction bits having a comparatively inferior ability to detect and correct errors are added to the low priority data. For this reason, the error detection and correction bits added to the high priority data tends to be longer in its size.

Here, FIG. 2 shows the construction of a transmitter for actually transmitting the frame having such structure. As shown in FIG. 2, in the transmitter 1, bit stream DH1 composed of high priority data is firstly input to a first error correction bit adding circuit 2, and bit stream DL1 composed of low priority data is input to a second error correction bit adding circuit 3.

The first error correction bit adding circuit 2 calculates the error detection and correction bits based on the input bit stream DH1 and adds this error detection and correction bits to the bit stream DH1, so as to form bit stream D1 which is stored in the high priority field. The bit stream D1 is output to a frame forming circuit 4 at a later stage. In connection, the first error correction bit adding circuit 2 calculates the error detection and correction bits having a superior ability to detect and correct errors and adds this.

While, the second error correction bit adding circuit 3 calculates the error detection and correction bits based on the input bit stream DL1 and adds this error detection and correction bits to the bit stream DL1, so as to form bit stream D2 which is stored in the low priority field. The bit stream D2 is output to a frame forming circuit 4 at a later stage. In connection, the second error correction bit adding circuit 3 calculates the error detection and correction bits having an inferior ability to detect and correct errors and adds this.

The frame forming circuit 4 adds the bit stream D2 to the end of the bit stream D1 to form transmission data stream D3 for one frame, which is output to a modulating circuit 5. The modulating circuit 5 modulates the transmission data stream D3 to form transmission symbol stream D4, which is output to a transmitting circuit 6.

The transmitting circuit 6, after performing the filtering processing on the transmission symbol stream D4, performs the digital-to-analog conversion processing on this to generate transmission signal and then performs the frequency conversion processing on the transmission signal to generate transmission signal S1. The transmitting circuit 6 transmits the transmission signal S1 via an antenna 7, so as to transmit data that the high priority data and the low priority data are combined.

On the other hand, as shown in FIG. 3, in a receiver 10, the transmission signal S1 transmitted from the transmitter 1 is received at an antenna 11, which is input to a receiving circuit 12 as reception signal S2. The receiving circuit 12, after performing the filtering processing on the reception signal S2, performs the frequency conversion processing on the reception signal S2 to take out baseband signal, and performs the analog-to-digital conversion processing on the baseband signal to take out reception symbol stream D5.

A demodulating circuit 13 performs a predetermined demodulation processing on the reception symbol stream D5 taken out by the receiving circuit 12 to restore reception data stream D6 (the reception data stream D6 is not completely equal to the transmission data stream D3, and includes data error received during transmission.), which is output to a field dividing circuit 14. The field dividing circuit 14 divides the reception data stream D6 into the bit stream D7 of the high priority field and the bit stream D8 of the low priority field, and outputs these bit streams D7 and D8 to a first error detection and correction circuit 15 and a second error detection and correction circuit 16 respectively.

The first error detection and correction circuit 15 detects data errors included in the received information bits based on the error detection and correction bits included in the bit stream D7, and corrects the data errors, so as to decode the transmitted information bits, which is output as bit stream DH2 of the high priority data. Similarly, the second error detection and correction circuit 16 detects data errors included in the received information bits based on the error detection and correction bits included in the bit stream D8, and corrects the data errors, so as to decode the transmitted information bits, which is output as bit stream DL2 of the low priority data. By this processing, the receiver 10 respectively decodes the high priority data and the low priority data from the reception signal S2.

Transmitting a combination of the high priority data and the low priority data is also performed by the cellular radio communication system such as a portable telephone system actually. This point will be concretely explained below with an example of a portable telephone system.

Generally, in a portable telephone system, the area where communication service is provided is divided into cells each having a desired size, and a base station as a fixed radio station is positioned in each cell. A portable telephone device as a mobile radio station radio-communicates with the base station within the cell where the device exists, and so-called cellular radio communication system is constructed.

In such portable telephone system, to call from a portable telephone device for example, the call processing is performed by the procedure explained below. The portable telephone device firstly transmits control data composed of preamble data and message data to a base station using control channel called random access channel (RACH). The base station constantly monitors the random access channel and detects the existence of the preamble data to detect whether there is a message from the portable telephone device or not. When the preamble data is detected, the base station judges that there is a message from the portable telephone device and detects the message data, and analyzes the contents of the message data.

As a result, if the contents of the message data is a call request, the base station decides the occupational control channel (DCCH) used to communicate with the portable telephone device, and informs this channel number to the portable telephone device using the response control channel (AGCH). After this, a predetermined control processing is executed between the portable telephone device and the base station via the informed occupational control channel, so that a call processing from the portable telephone device is realized.

Control data initially sent from the portable telephone device in the call processing is composed of preamble data and message data as described above. In this case, the preamble data represents the existence of message data. The base station side detects the existence of the preamble data firstly to detect whether there is message data or not. Accordingly, if the data is prioritized in accordance with the detection order viewing from the base station side, the preamble data has the highest priority, and the message data showing the concrete contents requested has lower priority comparing to the preamble data.

To detect the preamble data corresponding to the high priority data, in the normal portable telephone system of the frequency division multiple access (FDMA) method or the time division multiple access (TDMA) method, the preamble data is not detected by decoding, but is detected by measuring the electricity of the signal of the random access channel actually.

On the contrary to this, in the portable telephone system of the code division multiple access (CDMA) method, other signals are intermingled on the band not because of the physical division such as frequency or time but the division by the difference of spread codes. Thereby, simple measurement of signal electricity can not detect the preamble data, and resultantly the preamble data is detected by decoding. However, if the electric wave of the channel being used in other cell is received at the same level even in the portable telephone system of TDMA method, this is an example of such communication environment that the preamble data can not be detected by the simple measurement of signal electricity.

Here, the portable telephone system of the CDMA method will be concretely described below with an example of such communication environment that the preamble data can not be detected by the simple measurement of signal electricity. Note that control data is also composed of one frame in this case, and the control data is transmitted by one transmission slot.

As shown in FIG. 4, as the data structure of one frame, the preamble field is formed in the first half of the frame and the information field is in the latter half. In this case, the preamble data is stored in the preamble field, and the information bits constituting message data and the error detection and correction bits of the information bits are stored in the information field.

FIG. 5 shows the transmission/reception timing in the transmitting side and the receiving side when the control data having such data structure is transmitted/received via the random access channel. As shown in FIG. 5, in the portable telephone system, the distance between the portable telephone device being the transmitting side and the base station being the receiving side is not fixed. Further, since the portable telephone device synchronizes to meet the reception timing for receiving the signal transmitted from the base station, the portable telephone device already synchronizes with the base station in the condition that the transfer delay arises at this time.

Then, since the portable telephone device transmits the control data to the base station in this condition, transfer delay further arises when the control data is received by the base station. More specifically, at the time when the base station receives the control data from the portable telephone device, transfer delay for rounds has been already generated. In this way, in the portable telephone system, the transmission timing at the transmitting side is asynchronous with the reception timing at the receiving side due to the transfer delay of electric wave.

Accordingly, in the portable telephone system, if the portable telephone device transmits the control data at the transmission timing, the control data may not arrive at the base station at a normal reception timing. The base station of the receiving side needs to decode the received control data for one time slot at the accurate decoding timing. However, at the time when signal is received in the random access channel, the base station does not know when signal arrives, so that signal is needed to be detected not only with an accurate reception timing but also with very short time intervals, and useless decoding processing has been performed to decode the control data received actually.

Also, when the control data is received in the random access channel, the base station calculates the time lag due to the transfer delay for rounds and informs this delay time to the portable telephone device via the occupational control channel. Thereby, the portable telephone device advances the timing of transmitting the control data by the delay time, so as to synchronize the transmission and reception timing with the base station of the receiving side (hereinafter, referred to as "time alignment"). In addition, the slot of the signal which is transmitted and received between the portable telephone device and the base station in the normal random access channel is shorter than the normal slot, and this prevents the interference between slots.

Here, FIG. 6 shows the construction of a transmitter for actually transmitting such control data. As shown in FIG. 6, in the transmitter 20, bit stream DPI of preamble data is firstly input to a frame forming circuit 21, and bit stream DM1 of message data is input to an error correction bit adding circuit 22.

The error correction bit adding circuit 22 calculates error detection and correction bits based on the input bit stream DM1, and adds this to the bit stream DM1 so as to form bit stream D11 to be stored in the information field (FIG. 4), which is output to the frame forming circuit 21. The frame forming circuit 21 adds the bit stream D11 to the end of the bit stream DP1 of the preamble field as shown in FIG. 4 so as to form transmission data stream D12 for one frame, which is output to a modulating circuit 23.

The modulating circuit 23 performs a predetermined modulation processing on the transmission data stream D12 to form transmission symbol stream D13, which is output to a transmitting circuit 24. The transmitting circuit 24, after multiplying the transmission symbol stream D13 by a desired spread code and performing a filtering processing, performs the digital-to-analog conversion processing to generate transmission signal. The transmitting circuit 24 then performs the frequency conversion processing on the transmission signal to generate transmission signal S10 of a predetermined band. The transmitting circuit 24 transmits the transmission signal S10 via an antenna 25, so as to transmit the control data composed of preamble data and message data.

On the other hand, as shown in FIG. 7, in a receiver 30, the transmission signal S10 transmitted from the transmitter 20 is received at an antenna 31, which is input to a receiving circuit 32 as reception signal S11. The receiving circuit 32, after performing the filtering processing on the reception signal S11, performs the frequency conversion processing on the reception signal S11 to take out baseband signal, and performs the analog-to-digital conversion processing on the baseband signal to take out reception symbol stream D14.

The demodulating circuit 33 performs a predetermined demodulation processing on the reception symbol stream D14 taken out by the receiving circuit 32 to restore reception data stream D15 (the reception data stream D15 is not completely equal to the transmission data stream D12, and includes data errors received during transmission.), which is output to a field dividing circuit 34.

The field dividing circuit 34 divides the reception data stream D15 into bit stream D16 of preamble field and bit stream D17 of information field, which are output to a preamble detecting circuit 35 and an error detection and correction circuit 36 respectively. In connection, the field dividing circuit 34 divides the field by the time division method. More specifically, as shown in FIG. 4, the preamble field is temporally earlier than the information field, so as to divide the field by using this timing.

The preamble detecting circuit 35 judges whether the bit stream D16 is preamble data or not, and if it is preamble data, outputs control signal S12 to the error detection and correction circuit 36. The error detection and correction circuit 36 receives the control signal S12 and starts the error detection and correction processing to detect data errors included in the information bits of the received message data based on the error detection and correction bits included in the input bit stream D17, and corrects the data errors.

As a result, if the information bits of the message data is correctly decoded, the error detection and correction circuit 36 outputs bit stream DM2 of the message data to a control circuit (not shown) for controlling communication sequence, etc. Thereby, the control circuit can find the reception of message data, and can control the communication sequence in accordance with the message data.

In connection, it has been described that the field is divided by the field dividing circuit 34. However, there is also another case where the preamble data at the head of the reception data D15 is simply detected without the field division for separating data, and after the preamble data is detected as a result, the error correction processing of next message data is performed.

In the conventional communication method, when transmitting a combination of high priority data and low priority data, respective data are processed individually. However, the processing at the same level are only performed separately, and it does not consider the priority.

Also, in the conventional communication method, when transmitting control data using the random access channel for example, preamble data is detected to confirm the existence of message data. This processing can be realized easily since the preamble data and the message data are divided in the time direction. However, in a communication of the multi-carrier method which transmits data to be transmitted at the same time using a plurality of carriers, it is impossible to perform this processing in the time direction within one modulation time since the preamble data and the message data are not divided in the time direction.

Accordingly, in the case where the control data composed of preamble data and message data is transmitted by the multi-carrier method communication, it can be generally considered that the signal components of the preamble data and the signal components of the message data are extracted by dividing them in the frequency direction at the receiving side, to decode respective data. However, this method needs a high-precision filter for dividing the signal components of the preamble data and the signal components of the message data, thereby the construction of the device at the receiving side may become complicated.

Further, since the receiving side for receiving the control data via the random access channel can not judge which timing does the control data arrives at, it is needed to judge whether the control data is received or not for each very short time. There is a problem that the amount of processing becomes vast and it takes much time to process.

SUMMARY OF THE INVENTION

In view of the foregoing, an object of this invention is to provide a communication method which can perform a processing in accordance with the priority with a simple construction even if the high priority data and the low priority data are transmitted at the same time by the multi-carrier method, and proposes a transmitter, a receiver, and a cellular radio communication system which use the communication method.

The foregoing object and other objects of the invention have been achieved by the provision of a communication method, a transmitter, a receiver, and a cellular radio communication system.

According to this invention, in a communication method for transmitting high priority data and low priority data at the same time using a plurality of sub-carriers, the transmitting side transmits transmission signal in which high priority symbols composed of information bits of the high priority data and low priority symbols composed of information bits of the low priority data are positioned alternately, and each symbol of differential symbol stream obtained by differential-modulating the high priority symbol based on the differential phase between the high priority symbol and one previous low priority symbol is assigned to the sub-carrier, so that the sub-carriers on which the high priority data are superimposed and the sub-carriers on which the low priority data are superimposed are positioned alternately. The receiving side, when the transmission signal is received at a reception timing having time lag due to transfer delay, performs a predetermined reception processing on the received reception signal to obtain reception symbol stream which is the alignment of the high priority symbols and the low priority symbols positioned alternately on the time axis, detects the phase offset component from the high priority symbols of the symbol stream whose differential phase is removed, the differential phase which is obtained by differential-demodulating the reception symbol stream, and decodes the high priority data based on the signal component of the high priority symbols, and decodes the low priority data after the phase offset component is removed from the phase component of low priority symbol of the symbol stream.

Further, according to this invention, a transmitter for transmitting high priority data and low priority data at the same time using a plurality of sub-carriers, comprises transmitting means for transmitting transmission signal in which high priority symbols composed of information bits of the high priority data and low priority symbols composed of information bits of the low priority data are positioned alternately, and each symbol of differential symbols stream obtained by differential-modulating the high priority symbols based on the differential phase between the high priority symbol and one previous low priority symbol is assigned to the sub-carrier, so that the sub-carriers on which the high priority data are superimposed and the sub-carriers on which the low priority data are superimposed are positioned alternately.

Further, according to this invention, a receiver for receiving transmission signal transmitted from a transmitter, which transmits high priority data and low priority data at the same time using a plurality of sub-carriers, at a reception timing having time lag due to transfer delay, comprises: receiving means for receiving the transmission signal in which high priority symbols composed of information bits of the high priority data and low priority symbols composed of information bits of the low priority data are positioned alternately, and each symbol of differential symbol stream obtained by differential-modulating the high priority symbols based on the differential phase between the high priority symbol and one previous low priority symbol is assigned to the sub-carrier, so that the sub-carriers on which the high priority data are superimposed and the sub-carriers on which the low priority data are superimposed are positioned alternately; signal conversion processing means for performing a predetermined conversion processing on the reception signal received by the receiving means to convert it into reception symbol stream which is the alignment of the high priority symbols and the low priority symbols positioned alternately on the time axis; differential demodulating means for differential-demodulating the reception symbol stream to form the symbol stream whose differential phase is removed; first demodulating means for detecting the phase offset component from the high priority symbols of the symbol stream, and for decoding the high priority data based on the signal component of the high priority symbols; and second demodulating means for decoding the low priority data after the phase offset component is removed from the phase component of the low priority data of the symbol stream.

Further, according to this invention, the receiver comprises: receiving means for receiving the transmission signal in which high priority symbols composed of information bits of the high priority data and low priority symbols composed of information bits of the low priority data are positioned alternately, and the high priority symbol and the low priority symbol are respectively differential-modulated based on the differential phase between the symbol itself and one previous symbol, and the sub-carriers on which the high priority symbols are superimposed and the sub-carriers on which the low priority symbols are superimposed are positioned alternately; signal conversion processing means for performing the Fourier transform on the reception signal received by the receiving means to convert the high priority symbols and the low priority symbols which are lined on the frequency axis into reception symbol stream which is lined on the time axis; first differential demodulating means for differential-demodulating the reception symbol stream to form the symbol stream whose differential phase is removed; demodulating means for decoding the high priority data based on the signal component of the high priority symbol of the symbol stream; phase offset component detecting means for detecting the phase offset component from the high priority symbols of the symbol stream; phase removing means for removing the phase offset component of the high priority symbol of the reception symbol stream, and for removing the phase offset component from the phase component that the low priority symbol of the reception symbol stream has particularly; and second differential demodulating means for forming one composite symbol by composing respective symbols in the condition that there is no phase difference between the high priority symbol of the reception symbol stream and one previous low priority symbol by the phase removing means, differential-demodulating it by using adjacent composite symbol, and demodulating the differential-demodulated composite symbol to decode the low priority data.

Furthermore, according to this invention, in a cellular radio communication system in which a base station is provided for each cell wherein a predetermined area is divided to have a desired size, and a mobile station radio-communicates with the base station within the cell where the mobile station exists, the mobile station transmits via random access channel transmission signal in which preamble symbols composed of information bits of preamble data and message symbols composed of information bits of message data are positioned alternately, and each symbol of differential symbol stream obtained by differential-modulating the preamble symbol based on the differential phase between the preamble symbol and one previous message symbol is assigned to sub-carrier, so that the sub-carriers on which the preamble symbols are superimposed and the sub-carriers on which the message symbols are superimposed are positioned alternately. The base station, when the transmission signal is received at a reception timing having time lag due to transfer delay, performs a predetermined reception processing on the received reception signal to obtain reception symbol stream which is the alignment of the preamble symbols and the message symbols positioned alternately on the time axis, detects the phase offset component from the preamble symbols of the symbol stream whose differential phase is removed, which is obtained by differential-demodulating the reception symbol stream, and decodes the preamble data based on the signal component of the preamble symbols, and decodes the message data after the phase offset component is removed from the message symbol phase component of the symbol stream.

Furthermore, according to this invention, in the cellular radio communication system, the base station transmits via an initial acquisition channel transmission signal in which message symbols composed of information bits of message data and preamble symbols composed of information bits of preamble data are positioned alternately, and each symbol of differential symbol stream obtained by differential-modulating the preamble symbol based on the differential phase between the preamble symbol and one previous message symbol is assigned to sub-carrier, so that the sub-carriers on which the preamble symbols are superimposed and the sub-carriers on which the message symbols are superimposed are positioned alternately. The mobile station, when the transmission signal is received at a reception timing having time lag due to transfer delay, performs a predetermined reception processing on the received reception signal to obtain reception symbol stream which is the alignment of the preamble symbols and the message symbols positioned alternately on the time axis, detects the phase offset component from the preamble symbols of the symbol stream whose differential phase is removed, which is obtained by differential-demodulating the reception symbol stream, and decodes the preamble data based on the signal component of the preamble symbols, and decodes the message data after the phase offset component is removed from the message symbol phase components of the symbol stream.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Aspects of the First Embodiment (1-1) The Frame Structure

Figure 8:
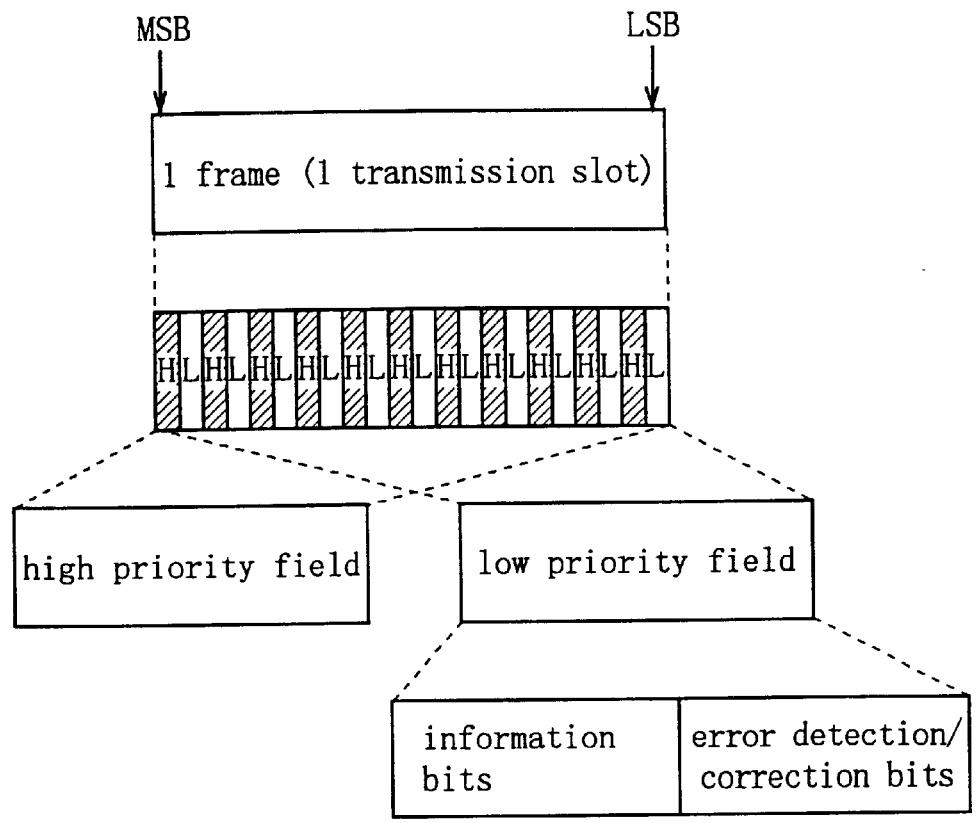
FIG. 8 is a schematic diagram illustrating the frame structure of a communication system according to the first embodiment.

The frame structure of the communication system according to this invention will be explained in this paragraph. In the communication system according to this invention, high priority data and low priority data are transmitted by one frame. At this time, as shown in FIG. 8, the transmission symbols of the high priority data (H) and the transmission symbols of the low priority data (L) are positioned alternately in the frame.

More specifically, when the transmission symbols (H) are collected alternately, they become the high priority field being the high priority data, and when the remained symbols are collected, they becomes the low priority field being the low priority data. In connection, these fields may be also composed of original information bits and error detection and correction bits.

In this case, the transmission symbols formed from the information bits of the low priority data and the transmission symbols formed from the error detection and correction bits added to the low priority data are stored in the low priority field. Any error detection and correction can be performed in the low priority field.

On the other hand, only the transmission symbols formed from the information bits of the high priority data are stored in the high priority field, and the transmission symbols formed from the error detection and correction bits are not stored. In addition, the high priority transmission symbols are symbols formed based on the coded bits generated by performing, on the information bits of the high priority data, the processing for extending a distance between series by the convolutional coding and the processing for orthogonalizing a distance between series by the M-ary modulation.

The error detection and correction bits are not added to the high priority data, but the processing for extending a distance between series and the processing for orthogonalizing a distance between series are performed, so that the high priority data can be decoded promptly and accurately by the correlation detection at the receiving side. In connection, in the high priority field, there is a case where the information bits of the high priority data are collected for several frames and the error detection and correction bits are added to this.

(1-2) The Carrier Structure

Figure 9:
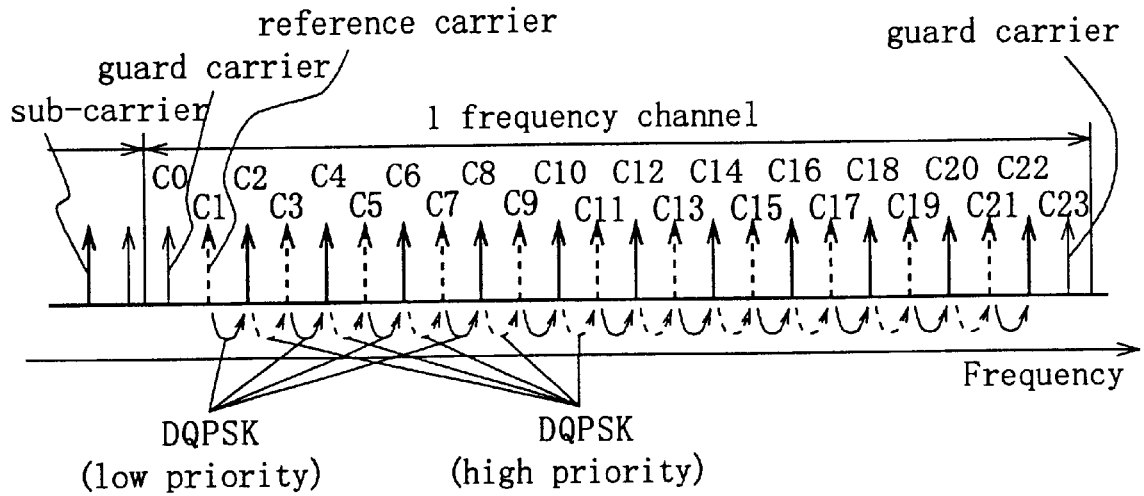
FIG. 9 is a schematic diagram showing the sub-carrier structure of the communication system according to the first embodiment.

The communication system according to this invention performs so-called multi-carrier communication for transmitting transmission symbols for one frame having the above-mentioned structure at the same time within one modulation time, using a plurality of sub-carriers. More specifically, as shown in FIG. 9, one frequency channel is composed of twenty-four sub-carriers C0 to C23 positioned on the frequency axis with the same intervals. Twenty-two sub-carriers C1 to C22, excepting sub-carriers C0 and C23 at both sides of the twenty-four sub-carriers C0 to C23 which are guard carriers, are used to transmit the transmission symbols for one frame. In the communication system, the transmission symbols to be transmitted within one modulation time are thereby transmitted while lined on the frequency axis.

In addition, for convenience, the following explanation is on condition that each transmission symbol is symbol-mapped by, for example, the Quadrature phase shift keying (QPSK) modulation and each transmission symbol is assigned to each of sub-carriers C1 to C22.

In the communication system, the transmission symbols having the frame structure shown in FIG. 8 are successively assigned to each of a plurality of sub-carriers C1 to C22 shown in FIG. 9 one by one. Since the sub-carrier C1 is a reference carrier used to obtain the differential phase to the next sub-carrier C2, the odd-numbered sub-carriers C3, C5, C7, C9, C11, C13, C15, C17, C19, and C21 are used to transmit the high priority transmission symbols, and the even-numbered sub-carriers C2, C4, C6, C8, C10, C12, C14, C16, C18, C20, and C22 are used to transmit the low priority transmission symbols.

In connection, the high priority transmission symbols are symbols formed by performing the QPSK modulation on the coded bits which have been generated by performing the extending processing of a distance between series by the convolutional coding and the orthogonal processing of a distance between series by the M-ary modulation on the information bits of the high priority data. To assign the symbols to sub-carriers, the differential phases between the high priority transmission symbols and one previous low priority data are obtained to be assigned to the odd-numbered sub-carriers C3, C5, C7, C9, C11, C13, C15, C17, C19, and C21. That is, the differential Quadrature phase shift keying (DQPSK) modulation is performed on the high priority transmission symbols to be assigned to the sub-carriers C3, C5, C7, C9, C11, C13, C15, C17, C19, and C21.

On the contrary, the low priority transmission symbols are symbols formed by performing the QPSK modulation on the information bits of the low priority data and on the error detection and correction bits added to the information bits. To assign the symbols to sub-carriers, the differential phases between the low priority transmission symbols and one previous high priority transmission symbols are obtained to be assigned to the even-numbered sub-carriers C2, C4, C6, C8, C10, C12, C14, C16, C18, C20, and C22. Also in this case, the DQPSK modulation is respectively performed on the low priority transmission symbol and they are assigned to the sub-carriers C2, C4, C6, C8, C10, C12, C14, C16, C18, C20 and C22.

Here, the DQPSK modulation are performed as a (modulation) method of assigning the low priority transmission symbols to sub-carriers, under the communication environment that the phase rotation is different in accordance with a sub-carrier, like the frequency selection fading. However, the QPSK modulation which is applied to synchronous detection can be also performed, under the communication environment that, for example, the phase rotation similarly occurs on each of sub-carriers like flat fading, that is, under the communication environment that it is possible to estimate the transmission path by only one reference carrier. Also, there is a case of modulation using other modulating methods other than the QPSK modulation.

(1-3) The Construction of Transmitter

Figure 10:
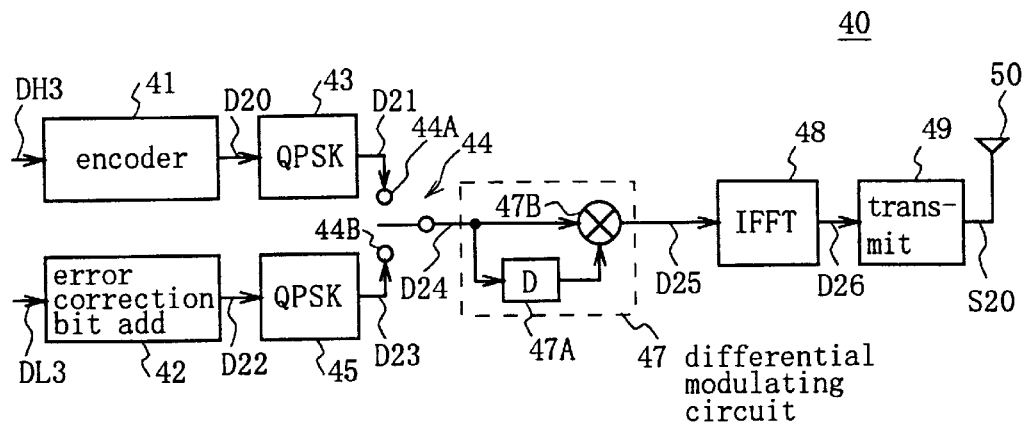
FIG. 10 is a block diagram showing the construction of a transmitter according to the first embodiment.

Next, the construction of a transmitter of the communication system according to this invention will be explained in this paragraph. In FIG. 10, 40 shows a transmitter of the communication system according to this invention as a whole. Bit stream DH3 of the high priority data is input to an encoder 41 and bit stream DL3 of the low priority data is input to an error correction bit adding circuit 42.

The encoder 41 codes the input high priority bit stream DH3 by performing, for example, the extending processing of a distance between series by the convolutional coding and the orthogonal processing of a distance between series by the M-ary modulation. The resultant coded bit stream D20 is output to a QPSK modulating circuit 43 at a later stage. The QPSK modulating circuit 43 successively performs the QPSK modulation processing on the input coded bit stream D20, so as to form transmission symbol stream D21, which is output to the first input terminal 44A of the first selection switch 44 at a later stage.

On the other hand, the error correction bit adding circuit 42 calculates the error detection and correction bits based on the input low priority bit stream DL3 and adds this to the bit stream DL3 to form the bit stream D22 on which a processing for error correction is performed. The bit stream D22 is output to a QPSK modulating circuit 45 at a later stage. The QPSK modulating circuit 45 QPSK-modulates the input bit stream D22 successively to form the transmission symbol stream D23, which is output to the second input terminal 44B of the first selection switch 44 at a later stage.

The first selection switch 44 connects a terminal to the first input terminal 44A of the upper section when the high priority transmission symbol which should be assigned to the odd-numbered sub-carrier is output, and connects a terminal to the second input terminal 44B of the lower section when the low priority transmission symbol which should be assigned to the even-numbered sub-carrier is output.

More specifically, the first selection switch 44 changes the connection of the first and second input terminals 44A, 44B alternately to select the high priority transmission symbol which is supplied to the first input terminal 44A and the low priority transmission symbol which is supplied to the second input terminal 44B alternately, so as to form the symbol stream D24 shown in FIG. 8 in which the high priority transmission symbols and the low priority transmission symbols are lined alternately on the time axis. The symbol stream D24 is input to the first delay circuit 47A and the first multiplier 47B which consist of a differential modulating circuit 47.

The differential modulating circuit 47 multiplies the transmission symbol currently input and the one previous transmission symbol obtained through the first delay circuit 47A by the first multiplier 47B, to differential-modulate the transmission symbol currently input based on the differential phase between the phase of the currently input symbol and the phase of one previous symbol. This processing is successively repeated to form the differential symbol stream D25, which is output to an inverse high-speed Fourier transform circuit (IFFT) 48. In this way, the differential modulating circuit 47 differential-modulates each transmission symbol currently input using one previous symbol as a reference symbol, regardless of the priority of the transmission symbol.

The inverse high-speed Fourier transform circuit 48 performs the inverse high-speed Fourier transform processing on the differential symbol stream D25 to generate such signal that symbols lined on the time axis are lined on the frequency axis. That is, the inverse high-speed Fourier transform circuit 48 allocates each symbol of the differential symbol stream D25 to each of the sub-carriers C2 to C22 successively. The transmission symbol stream D26 formed by the processing of the inverse high-speed Fourier transform circuit 48 is input to a following transmitting circuit 49.

The transmitting circuit 49 performs the window processing for one modulation time on the transmission symbol stream D26 and then performs the filtering processing, and further performs the digital-to-analog conversion processing to generate transmission signal. The transmitting circuit 49 then performs the frequency conversion processing on the transmission signal to generate transmission signal S20 of a predetermined frequency channel, which is transmitted via an antenna 50. In this way, the transmission signal S20 in which the high priority data and the low priority data are superimposed alternately on the sub-carriers C2 to C22 is transmitted from the transmitter 40.

(1-4) The Construction of Receiver

Figure 11:
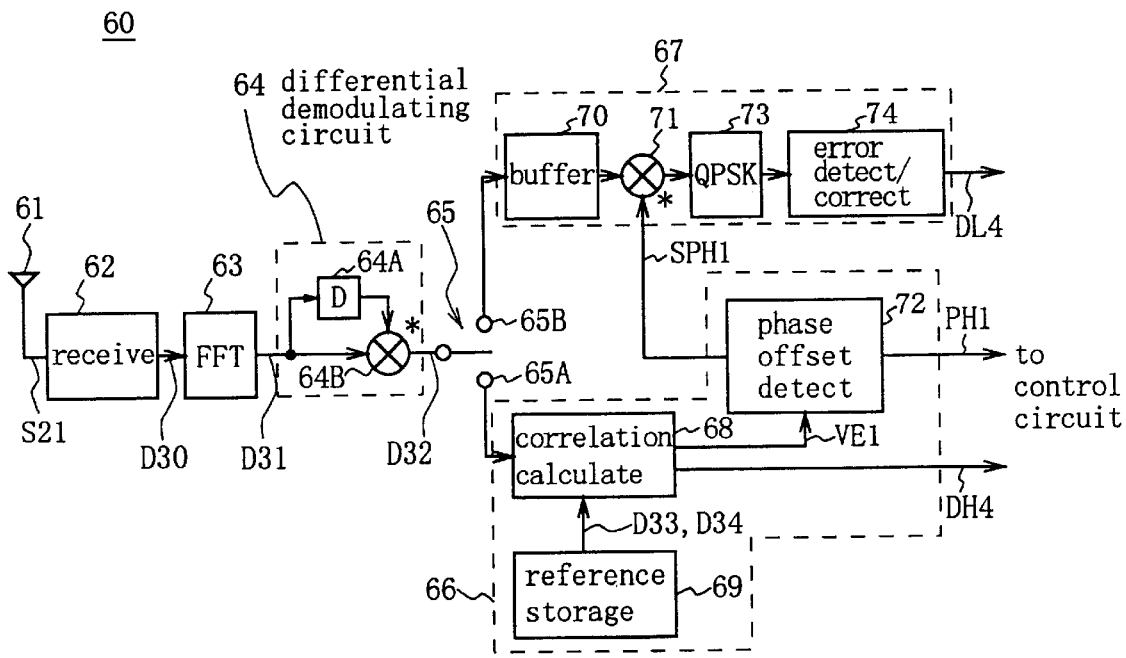
FIG. 11 is a block diagram showing the construction of a receiver according to the first embodiment.

Next, a receiver of the communication system according to this invention will be explained in this paragraph. In FIG. 11, 60 shows a receiver of the communication system according to this invention as a whole, which receives the transmission signal S20 transmitted from the transmitter 40 by an antenna 61 and inputs this to a receiving circuit 62 as reception signal S21.

The receiving circuit 62 performs the filtering processing and then frequency conversion processing on the reception signal S21 to take out baseband signal. The receiving circuit 62 further performs the analog-to-digital conversion processing on the baseband signal to obtain reception symbol stream D30, and performs the window processing on the reception symbol stream D30 for one modulation time, and thereafter outputs this to a high-speed Fourier transform circuit 63.

In this case, the time lag of the reception timing due to the transfer delay for rounds has already arisen at the time when the receiver 60 receives the transmission signal S20. Thereby, the phase rotation (phase offset components) occurs in each symbol of the reception symbol stream D30. In connection, the reception symbol stream D30 is a symbol stream before Fourier transform processing is performed, and is a symbol stream in which each symbol lines on the frequency axis.

The high-speed Fourier transform circuit 63 performs the high-speed Fourier transform processing on the reception symbol stream D30 to generate such signal that the symbols lined on the frequency axis are lined on the time axis. More specifically, the high-speed Fourier transform circuit 63 takes out the symbols which are superimposed on respective sub-carriers and forms the reception symbol stream D31 that the symbols superimposed on respective sub-carriers are lined on the time axis. The reception symbol stream D31 formed by the processing of the high-speed Fourier transform circuit 63 is input to a differential demodulating circuit 64 next.

In the differential demodulating circuit 64, the reception symbol stream D31 is input to the second delay circuit 64A and the second multiplier 64B respectively. The second multiplier 64B multiplies (complex-multiplies) the reception symbol currently input and the conjugate value of the one previous reception symbol supplied through the second delay circuit 64A, so as to perform the differential demodulation on the symbol stream D31. As a result, the symbol stream D31 is converted into the symbol stream D32 whose differential phase components is removed. Accordingly, each symbol of the symbol stream D32 has the phase components including the information phase and the phase offset components due to the time lag of the reception timing.

The selection switch 65 receives the symbol stream D32 at the input terminal, and connects a terminal to the first input terminal 65A of the lower section when the high priority symbols assigned to the odd-numbered sub-carriers, C3, C5, C7, C9, C11, C13, C15, C17, C19, and C21 are received. And, the selection switch 65 connects a terminal to the second input terminal 65B of the upper section when the low priority symbols assigned to the even-numbered sub-carriers, C2, C4, C6, C8, C10, C12, C14, C16, C18, C20, and C22 are received.

More specifically, the selection switch 65 changes the connection between the first input terminal 65A and the second input terminal 65B alternately, so as to output the high priority symbols of the symbol stream D32 to the first demodulating part 66, and output the low priority symbols to the second demodulating part 67.

The first demodulating part 66 is a demodulating part for demodulating the high priority data, and inputs the high priority symbols of the symbol stream D32 sent from the first input terminal 65A to a correlation calculating circuit 68. All reference symbol stream D33 which can be considered as the QPSK-modulated symbol stream of the high priority information field and the information bit stream being its original are stored in a reference storage circuit 69.

The correlation calculating circuit 68 reads out the reference symbol stream D33 from the reference storage circuit 69 and calculates the correlative value between the reference symbol stream D33 and the symbol stream D32 composed of the input high priority symbols. The information bit stream corresponding to the reference symbol stream D33 which has the largest correlative value is read out from the reference storage circuit 69 to be output as bit stream DH4 of the high priority data. The correlation calculating circuit 68 thereby can output bit stream DH4 as the high priority data decoded accurately with the phase offset components removed.

Further, the correlation calculating circuit 68 outputs vector VE1 (complex number) obtained by accumulative-adding I component and Q component of each symbol to a phase offset detecting circuit 72. Note that for the vector VE1, the phase is the average value and the amplitude is the total value accumulated.

The phase offset detecting circuit 72 detects the phase offset component PHI due to the time lag of the reception timing based on the vector VE1. The phase offset detecting circuit 72 outputs the phase offset component PH1 to the control circuit (not shown) for controlling the entire operation of the base station, and outputs symbol SPH1 having the phase offset component PH1 to the second demodulating part 67.

The base station calculates the delay time t1 due to the timing lag when receiving by the control circuit based on the phase offset component PH1, using the following equation:

[Eq. 1]

$$t1 = (\theta/2\pi) \times 1/f_{sc} \quad (1)$$

$f_{sc}$: sub-carrier spacing (the frequency difference between sub-carriers)

and informs this delay time t1 to the portable telephone device. In connection, the base station is also provided with the transmitter 40 described above, and transmits the delay time t1 to the portable telephone device via the transmitter 40. The portable telephone device thereby advances the timing of signal which is transmitted to the base station based on the time delay t1 (executes time alignment) so as to modify the time lag of the reception timing.

On the other hand, the second demodulating part 67 is a demodulating part for demodulating the low priority data, and inputs the low priority symbols of the symbol stream D32 sent from the second input terminal 65B of the selection switch 65 to a first-in first-out buffer (hereinafter referred to as "FIFO buffer") 70 to be stored successively. When the low priority symbols of the symbol stream D32 are stored for one slot, the FIFO buffer 70 reads out the symbol stream D32 by one symbol, and outputs this to the next third multiplier 71.

The third multiplier 71 complex-multiplies each symbol of the symbol stream D32 read out from the FIFO buffer 70 and the conjugate value of the symbol SPH1 having the phase offset component PH1 input from the phase offset detecting circuit 72 (in the figure, "*" represents conjugate), so as to remove the phase offset components from each symbol of the symbol stream D32 (the phase is set back for its rotation) and output it to the QPSK demodulating circuit 73.

The QPSK demodulating circuit 73 performs the QPSK demodulation on the low priority symbols that the phase offset is removed, so as to convert it to the information bit stream, which is output to an error detection and correction circuit 74. The error detection and correction circuit 74 detects and corrects the information bit stream errors based on the error detection and correction bits included in the information bit stream. Then, the resultant information bit stream which is restored accurately is output as the bit stream DL4 of the low priority data.

(1-5) Operations and Effects

In the above construction, in the transmitter 40 of the communication system, the symbol stream D21 formed from the high priority data and the symbol stream D23 formed from the low priority data are alternately selected, so as to form such symbol stream D24 that the high priority symbols and the low priority symbols are alternately lined as shown in FIG. 8. Then, the transmitter 40 differential-modulates each symbol of the symbol stream D24 to form the differential symbol stream D25, which is formed by differential-modulating each transmission symbol currently input using one previous symbol as a reference symbol, regardless of the priority of transmission symbol.

Next, the transmitter 40 performs the inverse high-speed Fourier transform processing on the differential symbol stream D25 to assign a symbol to each of a plurality of sub-carriers C2 to C22. In this case, since the high priority symbols and the low priority symbols are alternately positioned in the symbol stream D25, the high priority symbols and the low priority symbols are also alternately positioned on the frequency axis.

More specifically, the high priority symbols are superimposed on the odd-numbered sub-carriers C3, C5, C7, C9, C11, C13, C15, C17, C19, and C21 and the low priority symbols are superimposed on the even-numbered sub-carriers C2, C4, C6, C8, C10, C12, C14, C16, C18, C20, and C22. Thus formed transmission symbol stream D26 is transmitted as the transmission signal S20 via the antenna 50 after a predetermined transmission processing is performed.

On the other hand, in the receiver 60, the transmission signal S20 transmitted from the transmitter 40 is received by the antenna 61 at a reception timing having time lag due to transfer delay. A predetermined reception processing is performed on the transmission signal S20 to obtain the reception symbol stream D30, and the window processing is performed on the reception symbol stream D30. The receiver 60 performs the high-speed Fourier transform processing on the reception symbol stream D30 to perform the signal conversion from on the frequency axis to on the time axis, and further performs the differential demodulation to form the symbol stream D32. The symbol stream D32 is output in the state that the differential phase components is removed from each symbol.

The receiver 60 alternately changes the connection by the first selection switch 65 so that the high priority field symbols of the symbol stream D32 are output to the first demodulating part 66, and the low priority field symbols are output to the second demodulating part 67.

Then, the receiver 60 calculates the correlative value between the symbol stream D32 and the reference symbol stream D33 by the correlation calculating circuit 68 of the first demodulating part 66. The information bit stream corresponding to the reference symbol stream D33 having the largest correlative value is accurately decoded as bit stream DH4 of the high priority data. The phase offset component PH1 is detected based on the vector VE1 obtained by accumulative-adding the I component and Q component of each symbol of the symbol stream D32, which is output to the control circuit (not shown) for controlling the entire operation of the base station. Further, the receiver 60 outputs the symbol SPH1 having the phase offset components PH1 calculated by the correlation calculating circuit 68 of the first demodulating part 66 to the third multiplier 71 of the second demodulating part 67.

In this way, in the demodulating part 66, the first high priority data can be decoded efficiently and accurately, and the time lag of the reception timing is calculated by the phase offset component PH1 which has been calculated based on the high priority symbols of the symbol stream D32 as a delay time t1. The delay time t1 is informed to the portable telephone device so that the time alignment between transmission and reception can be performed.

Also, in the second demodulating part 67, the conjugate value of the symbol SPH1 having the phase offset component PH1 detected in the first demodulating part 66 and each symbol of the symbol stream D32 are complex-multiplied so as to remove the phase offset component from the low priority symbols of the symbol stream D32. After performing the QPSK demodulating processing, the errors of the information bit stream is corrected, and the information bit stream decoded accurately as a result is output as the bit stream DL4 of the low priority data.

Thus, in the communication system according to the first embodiment, at the receiving side, the high priority symbols composed of the information bits of high priority data and the low priority symbols composed of the information bits of low priority data are alternately positioned, and each symbol of the differential symbol stream obtained by differential-modulating based on the differential phase between the high priority symbol and one previous low priority symbol is successively assigned to the sub-carrier, so where the transmission signal S20 that the sub-carriers on which the high priority symbols are superimposed and the sub-carriers on which the low priority symbols are superimposed are alternately positioned is transmitted at the same time within one modulation time.

At the receiving side, even when the transmission signal S20 is received at a reception timing having time lag due to transfer delay, the high-speed Fourier transform processing is performed on the received reception signal S21 to obtain the reception symbol stream D31 in which the high priority symbols and low priority symbols are alternately lined on the time axis. The reception symbol stream D31 is differential-demodulated to obtain the symbol stream D32. The phase offset component PH1 is detected from the high priority symbols of the symbol stream D32, and the correlative value is detected based on the signal components of the high priority symbols, so as to decode the high priority data accurately. After the phase offset component is removed from the phase components of the low priority symbols of the symbol stream D32, the low priority data is decoded, so that the data can be decoded accurately by processing in accordance with the priority.

According to the above construction, at the transmitting side in the communication system, the high priority symbols and the low priority symbols are positioned alternately and each symbol of the differential symbol stream obtained by differential-modulating based on the differential phase between the high priority symbol and one previous low priority symbol is assigned to the sub-carrier, so that the transmission signal S20 that the sub-carriers on which the high priority symbols are superimposed and the sub-carriers on which the low priority symbols are superimposed are alternately positioned is transmitted at the same time within one modulation time. At the receiving side, even when the transmission signal S20 is received at a reception timing having time lag due to transfer delay, the high-speed Fourier transform processing and the differential demodulation are performed on the reception signal S21 to obtain the symbol stream D32. The phase offset component PH1 is detected from the high priority symbols of the symbol stream D32, and the high priority data is decoded accurately based on the signal components of the high priority symbols. After the phase offset component is removed from the phase components of the low priority symbols, the low priority data is decoded, so that even when the high priority data and the low priority data are transmitted at the same time within one modulation time, the high priority data and the low priority data can be decoded accurately with a simple construction by processing in accordance with the priority.

(2) Aspects of the Second Embodiment (2-1) Background Arts

An example in the case where this invention is applied to a cellular radio communication system will be explained in the aspects of the second embodiment. Note that a portable telephone system will be explained here as a cellular radio communication system.

At first, a portable telephone system which is the background arts of the second embodiment is explained. Generally, in the portable telephone system, an area for providing communication service is divided into cells having a desired size, and a base station is provided in each cell as a fixed radio station. A portable telephone device as a mobile radio station radio-communicates with the base station within the cell where the portable telephone device exists. In this way, so-called cellular radio communication system is constructed.

In the portable telephone system, to call from the portable telephone device for example, a call processing is performed by the following procedure. The portable telephone device firstly transmits control data composed of preamble data and message data to a base station using a control channel called a random access channel (RACH). The base station monitors the random access channel at all times and detects whether or not there is a message from the portable telephone device by detecting the existence of the preamble data.

If the preamble data is detected, the base station then judges that there is message data from the portable telephone device, and detects the next message data to analyze the contents of the message data. As a result, if the contents of the message data is call request, the base station decides an occupational control channel (DCCH) used for communication with the portable telephone device, and informs this channel number to the portable telephone device using the response control channel (AGCH). Thereafter, a predetermined control processing is executed between the portable telephone device and the base station via the informed occupational control channel, so as to realize the call processing from the portable telephone device.

In the call processing, the control data firstly transmitted from the portable telephone device is composed of the preamble data and the message data as described above. In this case, the preamble data represents the existence of message data, and the base station side detects the preamble data to detect whether or not there is the message data. Accordingly, if data is prioritized based on the detection order viewing from the base station side, the preamble data has the highest priority, and the message data representing the concrete contents requested has the lower priority comparing to the preamble data.

To detect the preamble data corresponding to the high priority data, the electricity of the random access channel is generally measured. However, the preamble data may not be detected by the electricity measurement depending on the communication method. For example, in the portable telephone system using the CDMA method which performs the code division and the TDMA method which performs so-called frequency hopping for changing the frequency channel for each slot, the preamble data can not be detected by the simple electricity measurement since other signals are intermingled on the band or the band is changed one after another. Therefore, this type of the portable telephone system decodes the preamble data itself by detecting the preamble data.

At this time, if the preamble data can be detected promptly by decoding, there is no problem because the following message data can be decoded. However, if the preamble data can not be detected promptly, the message data may not be decoded. For instance, in the case of the multi-carrier method that a plurality of sub-carriers are used to transmit the preamble data and the message data at the same time for one modulation time, the message data may not be decoded if the preamble data is not detected by promptly extracting the signal components of the preamble data. Hence, in this invention, even in the case of the multi-carrier communication on the condition that the preamble data representing the existence of message can not be detected by the electricity measurement, the preamble data can be detected promptly. Hereinafter, this point will be explained step by step.

(2-2) The Frame Structure

Figure 12:
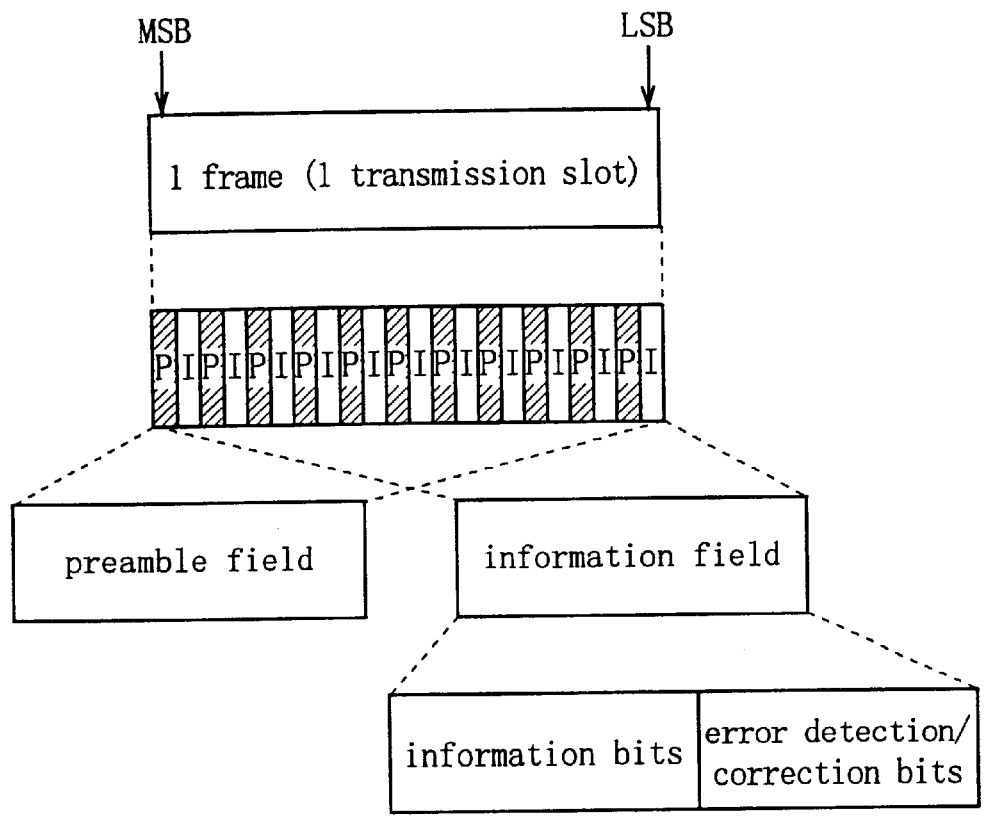
FIG. 12 is a schematic diagram showing the frame structure of control data of the communication system according to the second embodiment.

FIG. 12 shows the frame structure of the control data composed of preamble data and message data. As shown in FIG. 12, in the portable telephone system according to this invention, the control data composed of the preamble data and the message data is transmitted by one frame. At this time, the transmission symbols of the preamble data (P) and the transmission symbols of the message data (I) are alternately positioned in the frame. More specifically, when the transmission symbols positioned by turns are collected alternately, they becomes a preamble field which is the preamble data, and when the other remained transmission symbols are collected, they becomes an information field which is the message data.

In this case, in the information field, the transmission symbols formed from the message data representing the control contents toward the base station and the transmission symbols formed from the error detection and correction bits which are added to the message data are stored. On the contrary to this, in the preamble field, the transmission symbols formed from the preamble data representing the existence of message data are stored. In connection, the preamble data is a peculiar data set for each base station individually. The portable telephone device being a mobile station uses as preamble data the peculiar data of the base station with which the device desires to communicate.

In addition, a plurality of peculiar data are prepared for one base station in accordance with the attribute (type, etc.) of the message data. The portable telephone device uses the peculiar data suitable for the attribute of the message data transmitted to the base station as preamble data. That is, if a plurality of peculiar data are prepared for one base station, it is possible to represent the attribute of the message data by the preamble data.

For example, if three types of peculiar data are assigned to one base station, the base station can identify three types of attribute of the received message data. At this time, the portable telephone device being a mobile station transmits the preamble data, as high priority information, corresponding to the attribute of the message data in the base station with which the device desires to communicate. The base station being the receiving side detects the preamble data not only to confirm the existence of the message data, but also to acknowledge the attribute of the message data. In this way, in the portable telephone system according to this invention, when starting a call from the portable telephone device for example, the control data in which a call request is represented as the attribute of the message data is transmitted to the base station via the random access channel.

(2-3) Transmission/Reception Timing of Control Data in Random Access Channel

Figure 1:
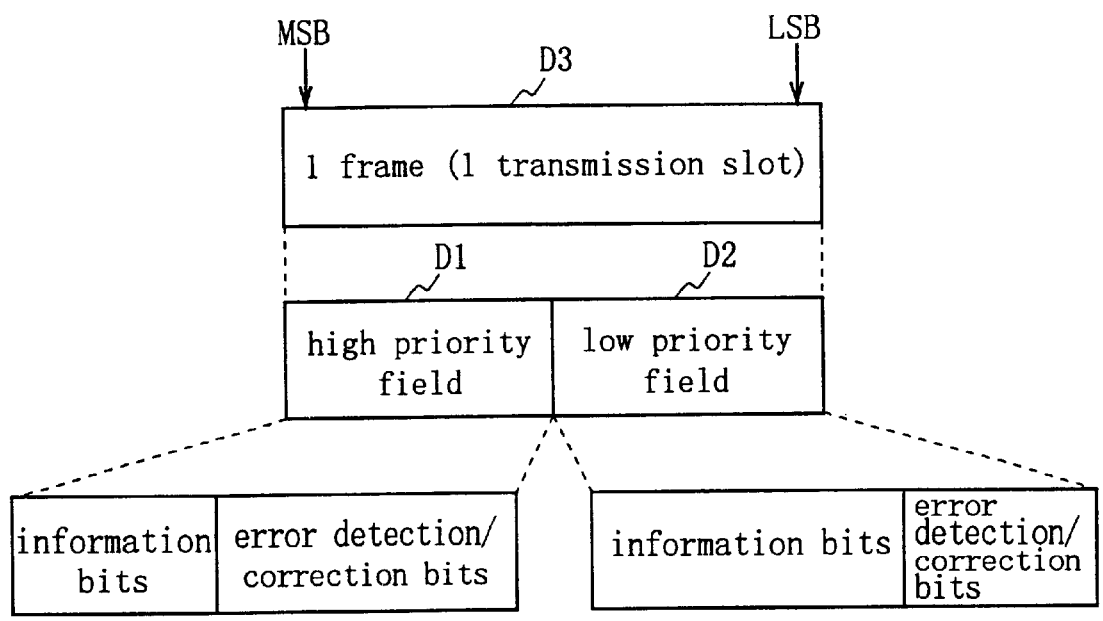
FIG. 1 is a schematic diagram showing the conventional frame structure.
Figure 2:
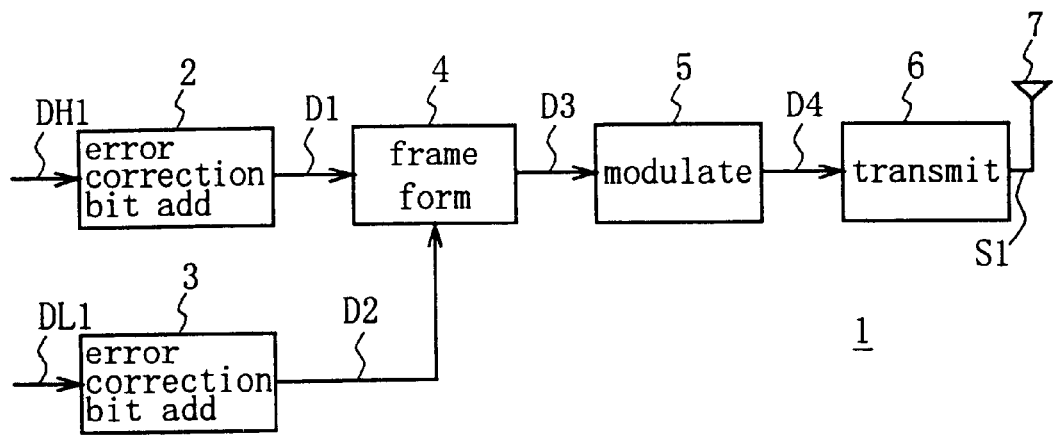
FIG. 2 is a block diagram showing the construction of a conventional transmitter.
Figure 3:
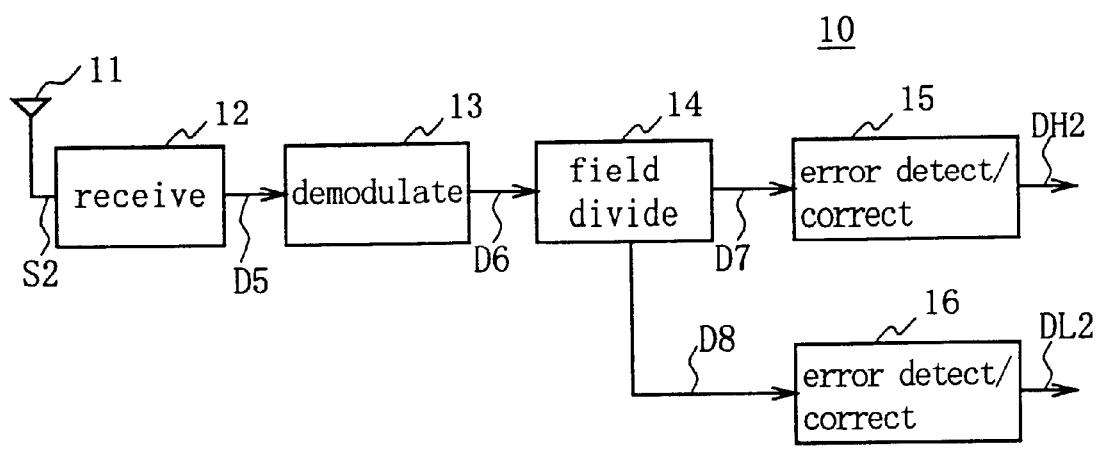
FIG. 3 is a block diagram showing the construction of a conventional receiver.
Figure 4:
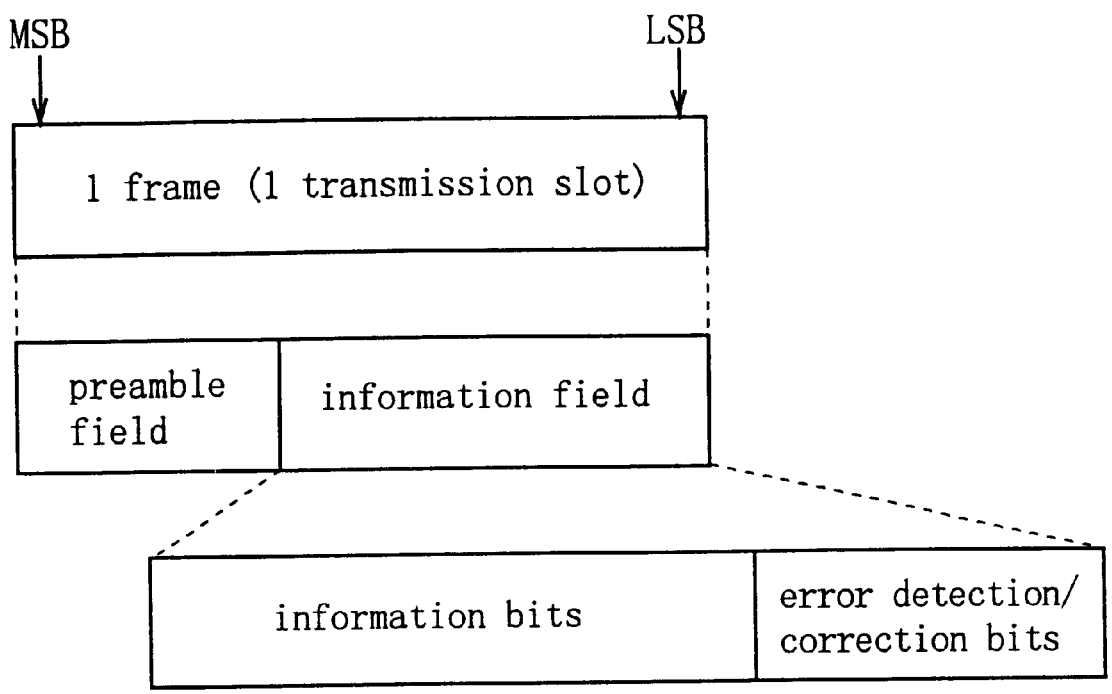
FIG. 4 is a schematic diagram showing the frame structure of a conventional control data.
Figure 5:
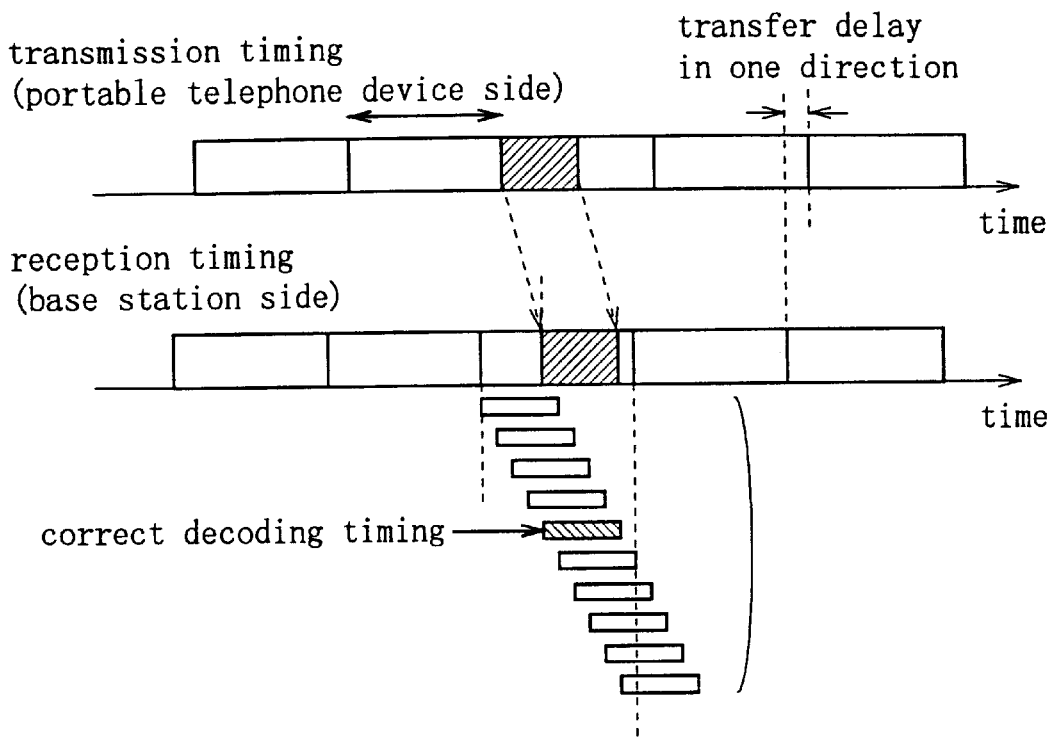
FIG. 5 is a timing chart showing the transmission and reception timing of the control data in a conventional random access channel.
Figure 6:
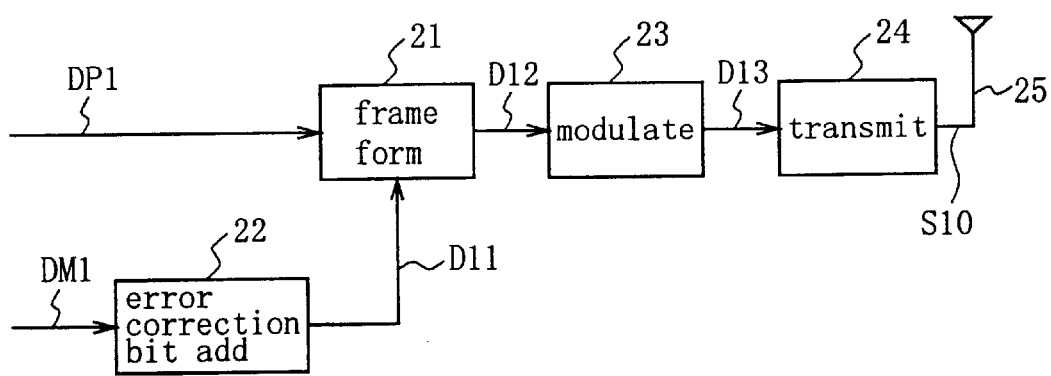
FIG. 6 is a block diagram showing the construction of a conventional transmitter for control data.
Figure 7:
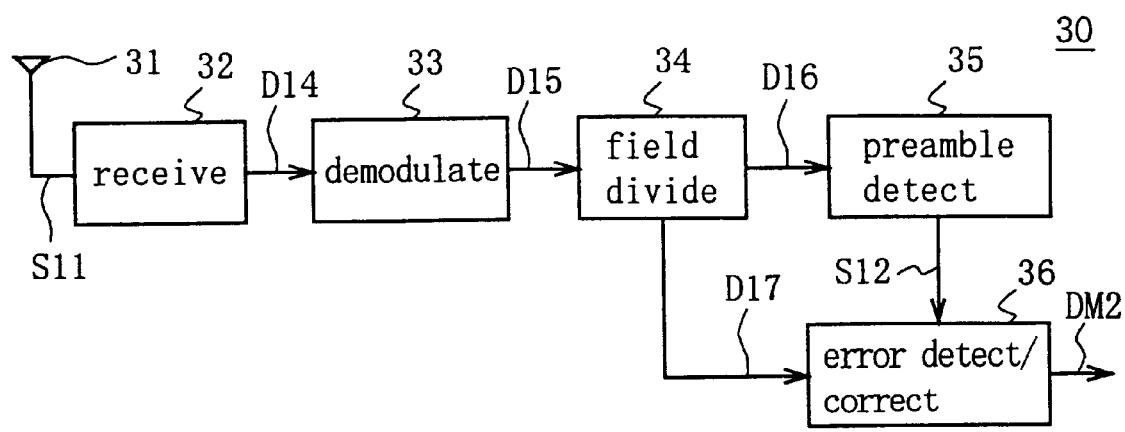
FIG. 7 is a block diagram showing the construction of a conventional receiver for control data.

Next, the transmission and reception timings when the portable telephone device transmits control data via the random access channel and the control data is received at the base station being the receiving side will be explained with referring to the timing charts of FIG. 13. In the conventional portable telephone system, as shown in FIG. 5, the transmission and reception timings when the control data is transmitted and received via the random access channel are temporarily asynchronous with each other. Signal arrives at the base station being the receiving side at a timing which is asynchronous with the portable telephone device being the transmitting side.

Figure 13:
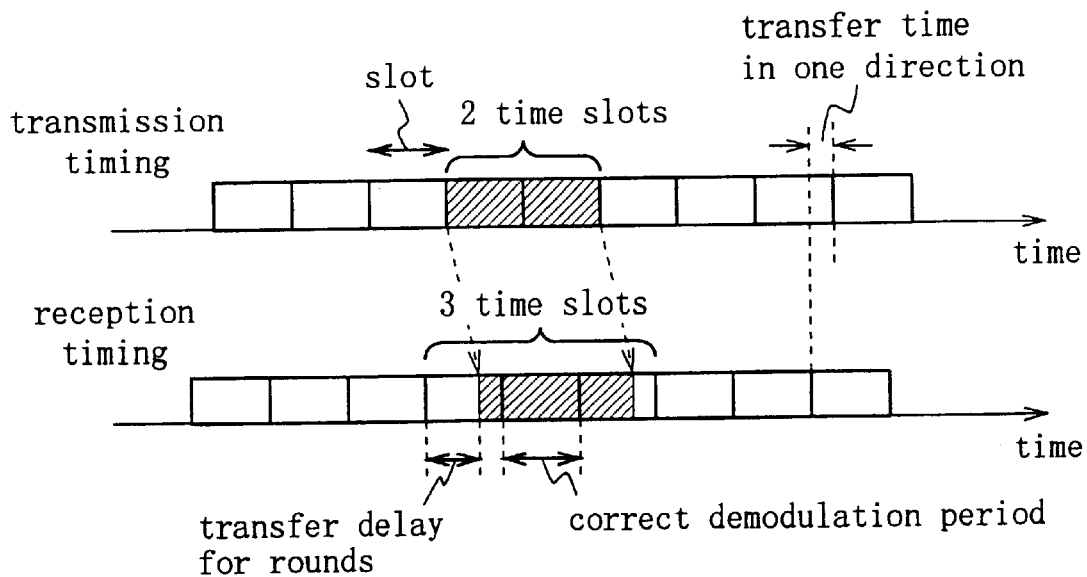
FIG. 13 is a timing chart showing the transmission and reception timing of control data in the random access channel of the communication system according to the second embodiment.

Hence, in the communication system according to this invention, as shown in FIG. 13, the portable telephone device being the transmitting side transmits the one modulation time control data for at least two time slots. In this case, the base station being the receiving side needs the control data for one cycle to demodulate one control data. However, if the control data for at least two time slots is transmitted, the control data for one time slot among three time slots can be surely secured when the window processing is performed at a normal timing.

Therefore, when the base station being the receiving side receives the control data of the random access channel, it is not necessary to demodulate signal by performing the window processing for each very short time, as a conventional one. The control signal can be demodulated certainly only by demodulating it periodically, like normal message which is synchronous between the transmission and reception, so that the useless demodulation is not needed to be performed and the processing amount can be reduced significantly.

(2-4) The Structure of Control Data

Figure 14:
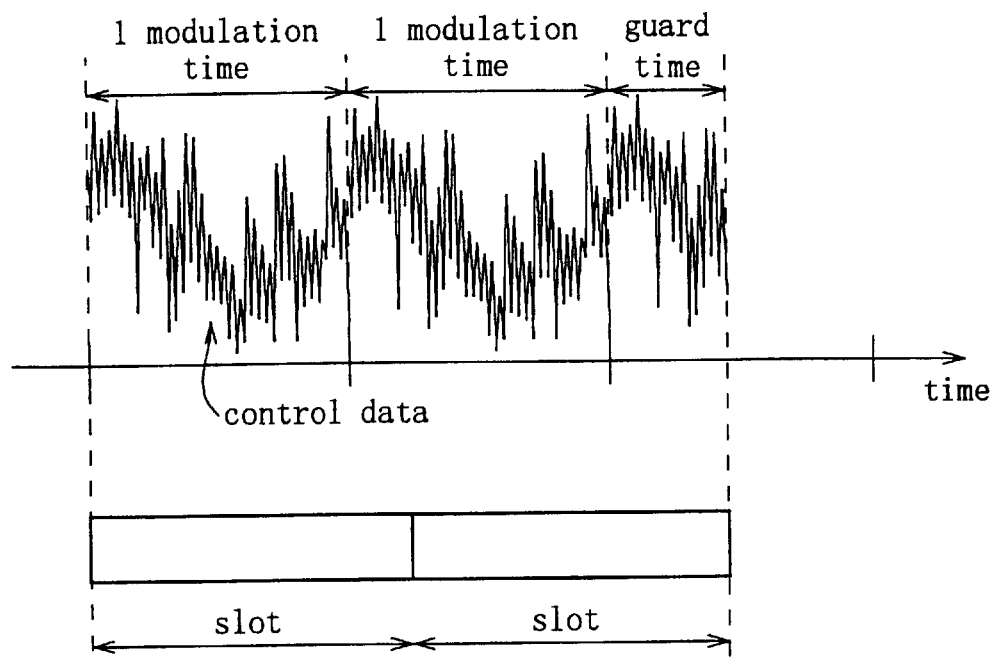
FIG. 14 is a schematic diagram illustrating the control data structure according to the second embodiment.

The structure of the control data which is transmitted for two time slots via the random access channel is explained with referring to FIG. 14. As shown in FIG. 14, the transmitting side transmits the control data for two time slots in the condition that the control data for one modulation time repeats two times and the same control data is inserted to the guard time. Thereby, even when the control data is received at a reception timing with delay due to time lag at the receiving side, the control data for two time slots is transmitted, so that the control data for one cycle is surely extracted by performing the window processing at a normal timing, to demodulate the control data certainly.

In this case, one control data can be demodulated certainly. However, the time lag due to transfer delay for rounds arises on the reception timing when the base station receives, and the phase rotation occurs on each symbol of the received symbol stream by this time lag. In addition, the phase offset component due to the phase rotation must be removed before the data is decoded. This point will be described later.

(2-5) The Structure of Random Access Channel

Figure 15:
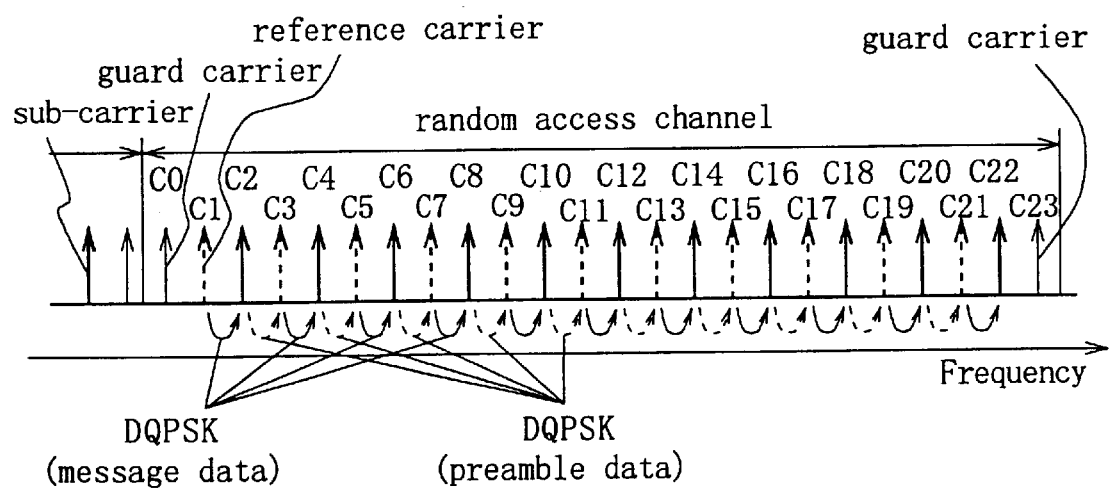
FIG. 15 is a schematic diagram showing the structure of a random access channel of the communication system according to the second embodiment.

Here, FIG. 15 shows the structure of the random access channel of the portable telephone system. The portable telephone system also performs a multi-carrier communication similarly to the first embodiment, and has a plurality of sub-carriers as the random access channel. More specifically, as shown in FIG. 15, the random access channel is composed of, for example, twenty-four sub-carriers C0 to C23 positioned with the same intervals on the frequency axis. Twenty-two sub-carriers C1 to C22, excepting sub-carriers C0 and C23 which are guard carriers at both sides of the twenty-four sub-carriers C0 to C23, are used to transmit the transmission symbols of the control data described above.

In the portable telephone system, the transmission symbols of the control data are assigned one by one to a plurality of sub-carriers C1 to C22 shown in FIG. 15. Since the sub-carrier C1 is a reference carrier used to take the differential phase with the next sub-carrier C2, the odd-numbered sub-carriers C3, C5, C7, C9, C11, C13, C15, C17, C19, and C21 are used for the transmission symbols of the preamble data and the even-numbered sub-carriers C2, C4, C6, C8, C10, C12, C14, C16, C18, C20, and C22 are used for the transmission symbols of the message data.

In connection, the differential phase between the transmission symbol of the preamble data and the transmission symbol of one previous message data is taken, and the transmission symbols of the preamble data are assigned to the sub-carriers C3, C5, C7, C9, C11, C13, C15, C17, C19, and C21 with the differential phase components on the information. The transmission symbols of the message data are symbols formed by QPSK-modulating the information bits and the error detection and correction bits added to the information bits. To assign the transmission symbols of the message data to the sub-carriers, the differential phase between the transmission symbol of the message data and the transmission symbol of one previous preamble data is taken, and the transmission symbol of the message data are assigned to the sub-carriers C2, C4, C6, C8, C10, C12, C14, C16, C18, C20, and C22 with the differential phase components on the information. That is, the transmission symbols of the preamble data and message data are DQPSK-modulated and assigned to the odd-numbered and even-numbered sub-carriers.

Here, since this case is under the communication environment that the phase rotation is different for each sub-carrier like the frequency selection fading, the DQPSK modulation is applied as a (modulation) method of assigning the transmission symbols of the message data to sub-carriers. However, under the communication environment that the phase rotation occurs on each sub-carrier like the flat fading, that is, the communication environment that the transmission path can be estimated by only one reference carrier, the QPSK modulation which is applied for synchronous detection can be performed. Also, other modulation methods other than the QPSK modulation can be used to modulate.

(2-6) The Construction of Transmitter

Figure 16:
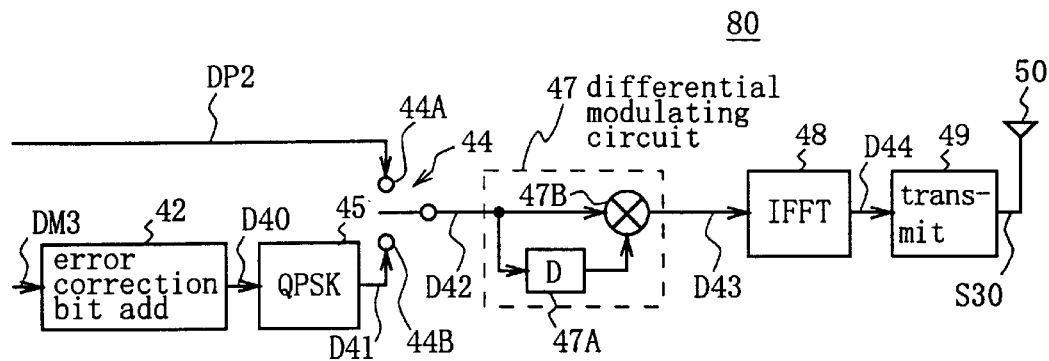
FIG. 16 is a block diagram showing the construction of a transmitter for control data according to the second embodiment.

Here, the construction of a transmitter for transmitting control data via the random access channel will be explained. In FIG. 16 where the portions corresponding to those of FIG. 10 are designated with the same reference numerals, 80 shows a transmitter for transmitting control data via a random access channel as a whole. The transmitter 80 is provided in the portable telephone device, and transmits the control data transmitted to the base station via the random access channel.

In the transmitter 80, preamble data DP2 consisting of control data is input to the first input terminal 44A of the first selection switch 44. Note that the preamble data DP2 is the peculiar data of the base station with which the portable telephone device desires to communicate and is the symbolized data suitable for the attribute of message data DM3 described later.

On the other hand, the message data DM3 consisting of control data is input to the error correction bit adding circuit 42. The error correction bit adding circuit 42 calculates the error detection and correction bits based on the information bits of the input message data DM3, and adds the error detection and correction bits to the message data DM3 to form bit stream D40 on which a processing for error correction is performed, which is output to the QPSK modulating circuit 45 at a later stage. The QPSK modulating circuit 45 successively performs the QPSK modulation processing on the input bit stream D40 to form symbol stream D41, which is output to the second input terminal 44B of the first selection switch 44 at a later stage.

The first selection switch 44 connects a terminal to the first input terminal 44A of the upper section when the symbols of the preamble data DP2 assigned to the odd-numbered sub-carriers, C1, C3, C5, C7, C9, C11, C13, C15, C17, C19, and C21 are output. The first selection switch 44 connects a terminal to the second input terminal 44B of the lower section when the symbols of the message data DM3 assigned to the even-numbered sub-carriers, C2, C4, C6, C8, C10, C12, C14, C16, C18, C20, and C22 are output.

More specifically, the first selection switch 44 changes the connection of the first input terminal 44A and the second input terminal 44B alternately to select the transmission symbols of the preamble data DP2 supplied to the first input terminal 44A and the transmission symbols of the message data supplied to the second input terminal 44B alternately, so as to form symbol stream D42, as shown in FIG. 12, of which the symbols (P) of the preamble data DP2 and the symbols (I) of the message data DM3 are lined alternately. The symbol stream D42 is output to the first delay circuit 47A and the first multiplier 47B which consist of the differential modulating circuit 47.

The differential modulating circuit 47 differential-modulates the transmission symbol currently input based on the differential phase between the symbol currently input and one previous input symbol, by multiplying the symbol currently input and the one previous symbol obtained through the delay circuit 47A by the first multiplier 47B. This processing is successively repeated to form the differential symbol stream D43, which is output to the inverse high-speed Fourier transform circuit (IFFT) 48. Thereby, the differential modulating circuit 47 differential-modulates each transmission symbol currently input using the transmission symbols before one unit of time as a reference symbol, regardless of the transmission symbol of the preamble data or message data.

The inverse high-speed Fourier transform circuit 48 performs the inverse high-speed Fourier transform processing on the symbol stream D43 to generate such signal that the symbols lined on the time axis are lined on the frequency axis. More specifically, the inverse high-speed Fourier transform circuit 48 allocates each symbol of the symbol stream D43 to the sub-carriers C2 to C22 successively. The transmission symbol stream D44 formed by the processing of the inverse high-speed Fourier transform circuit 48 is input to the next transmitting circuit 49.

The transmitting circuit 49 forms the transmission symbol stream D44 for two time slots, and performs the window processing and the filtering processing on the transmission symbol stream D44 for two time slots, and further performs the digital-to-analog conversion processing to generate transmission signal. The transmitting circuit 49 then performs the frequency conversion processing on the transmission signal to generate transmission signal S30 of a predetermined frequency channel, which is transmitted via an antenna 50. In this way, the control data in which the symbols of preamble data DP2 and the symbols of message data DM3 are superimposed alternately on the sub-carriers C2 to C22 is transmitted from the transmitter 80 as the transmission signal S30 for two time slots.

(2-7) The Construction of First Receiver

Figure 17:
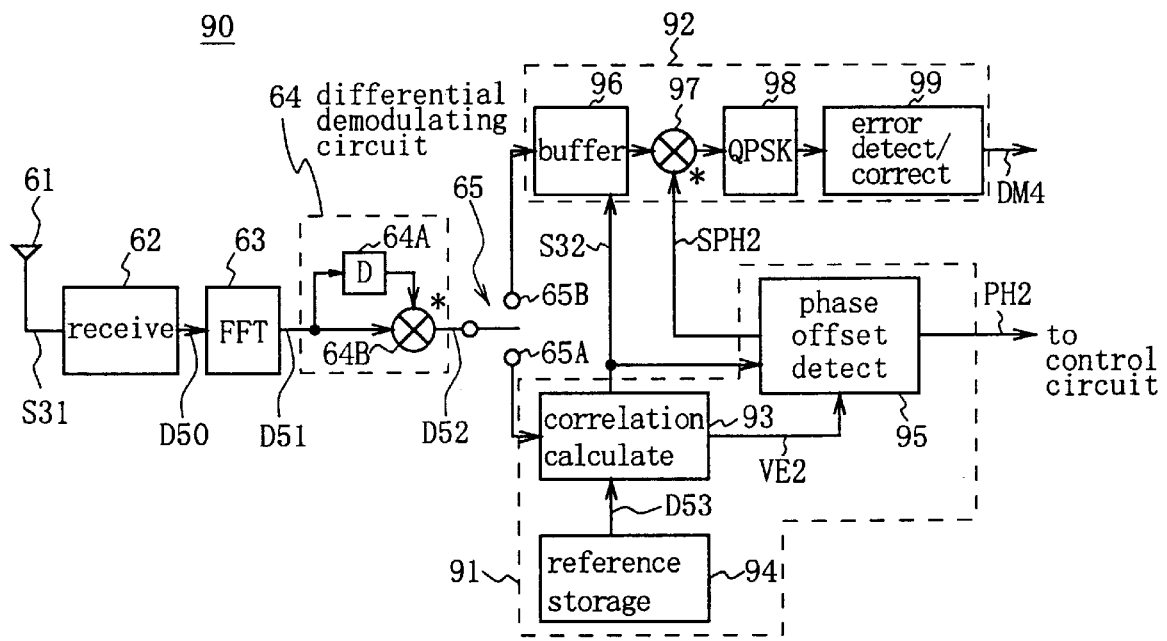
FIG. 17 is a block diagram showing the construction of the first receiver for control data according to the second embodiment.

Next, the first receiver for receiving the transmission signal S30 transmitted via the random access channel described above will be explained. In FIG. 17 where the portions corresponding to those of FIG. 11 are designated with the same reference numerals, 90 shows the first receiver for receiving the transmission signal S30 transmitted via the random access channel as a whole. The first receiver 90, which is provided in the base station, receives the transmission signal S30 being control data transmitted from the portable telephone device as described above. In addition, not only the transmitter 80 but also the receiver 90 is provided in the portable telephone device, and not only the receiver 90 but also the transmitter 80 described above is provided in the base station.

The receiver 90 receives the transmission signal S30 transmitted from the transmitter 80 by the antenna 61, and inputs this to the receiving circuit 62 as reception signal S31. The receiving circuit 62 performs the filtering processing and then frequency conversion processing on the reception signal S31 to take out baseband signal.

The receiving circuit 62 performs the analog-to-digital conversion processing on the baseband signal to obtain reception symbol stream, and performs the window processing on the reception symbol stream for one modulation time at a normal timing, and normalizes each symbol with the total value of the signal electricity for one modulation time (or the total value of the amplitude). Then, the resultant reception symbol stream D50 is output to the high-speed Fourier transform circuit 63. Here, the control data for two time slots is transmitted from the transmitter 80 as the transmission signal S30, so that the window processing is only performed at a normal timing to receive the transmission signal S30 for one time slot certainly.

In this case, when the receiver 90 receives the transmission signal S30, the time lag of receiving timing has already occurred and thereby the phase rotation (phase offset component) occurs in each symbol of the reception symbol stream D50. In connection, the reception symbol stream D50 is a symbol stream before the Fourier transform is performed, and is a symbol stream that symbols are lined on the frequency axis.

The high-speed Fourier transform circuit 63 performs the high-speed Fourier transform processing on the reception symbol stream D50 to generate such signal that the symbols lined on the frequency axis are lined on the time axis. More specifically, the high-speed Fourier transform circuit 63 takes out the symbols superimposed on respective sub-carriers, and forms the reception symbol stream D51 which is lined on the time axis. The reception symbol stream D51 formed by the processing of the high-speed Fourier transform circuit 63 is input to the differential demodulating circuit 64 next.

The differential demodulating circuit 64 inputs the reception symbol stream D51 to the second delay circuit 64A and the second multiplier 64B respectively. The second multiplier 64B multiplies (complex-multiplies) the reception symbol currently input and the conjugate value of the one previous reception symbol supplied via the second delay circuit 64A, so as to differential-demodulate the reception symbol stream D51 to form the symbol stream D52 that the differential phase component of each symbol is removed.

The selection switch 65 receives the symbol stream D52 at the input terminal, and connects a terminal to the first input terminal 65A of the lower section when the symbol stream D52 is the symbols which are assigned to the odd-numbered sub-carriers C1, C3, C5, C7, C9, C11, C13, C15, C17, C19, and C21, and connects a terminal to the second input terminal 65B of the upper section when the symbol stream D52 is the symbols which are assigned to the even-numbered sub-carriers C2, C4, C6, C8, C10, C12, C14, C16, C18, C20, and C22.

More specifically, the selection switch 65 changes the connection between the first input terminal 65A and the second input terminal 65B alternately, to output the high priority preamble data of the symbol stream D52 to the first demodulating part 91, and to output the low priority message data to the second demodulating part 92.

The first demodulating part 91 is a demodulating part for detecting the preamble data, and inputs the symbols of the preamble data of the reception symbol stream D52 sent from the first input terminal 65A of the selection switch 65 to a correlation calculating circuit 93. In the reference storage circuit 94, all reference symbol stream D53 which can be considered as the symbol stream of the preamble data peculiar to each base station, and the attribute information of the information bit stream being the original and preamble data are stored plurally.

The correlation calculating circuit 93 successively reads out the reference symbol stream D53 from the reference storage circuit 94 and calculates the correlative value between the reference symbol stream D53 and the input symbol stream D52 (in this case, the electricity of the symbol stream D52). If the correlative value exceeds a predetermined threshold value, the correlation calculating circuit 93 judges that the preamble data is received (that is, judges that the message data exists) and outputs control signal S32 representing the start of demodulating the message data to the second demodulating part 92. In connection, the correlation calculating circuit 93 calculates the correlative value to the reference symbol stream D53 using the symbol stream D52 after each symbol is normalized by the receiving circuit 62, so that the correct correlative value can be calculated.

By the way, when a plurality of preamble data are assigned to the base station for the purpose of giving the attribute to the message data, the correlation calculating circuit 93 calculates the correlative value to all of the reference symbol stream D53 stored in the reference storage circuit 94, and judges that the preamble data having a predetermined attribute is received when the correlative value exceeds the threshold value. The receiver 90 is possible to obtain the attribute of the message data by detecting the preamble data. In connection, when the correlative value exceeds a predetermined threshold value to a plurality of preamble series, the receiver 90 judges that the preamble data having the largest correlative value is received.

At this time, the phase rotation occurs on each symbol of the input symbol stream D52 by the time lag of the reception timing. The correlation calculating circuit 93 cumulatively adds the I component and Q component of each symbol to obtain vector (complex number) VE2, which is output to a phase offset detecting circuit 95. The phase offset detecting circuit 95 detects the phase offset component PH2 based on the input vector VE2, and outputs this to the control circuit (not shown) for controlling the entire operation of base station, and outputs the symbol SPH2 having the phase offset component PH2 to the second demodulating part 92.

The base station calculates the delay time t2 due to the timing lag at the time of receiving by the control circuit using the following equation:

[Eq. 2]

$$t2 = (\theta/2\pi) \times 1/f_{sc} \quad (2)$$

$f_{sc}$: sub-carrier spacing (the frequency difference between sub-carriers) based on the phase offset component PH2. The delay time t2 is transmitted to the portable telephone device via the transmitter 80. The portable telephone device advances the timing of a signal transmitted to the base station based on the delay time t2 (performs time alignment) to remove the time lag of reception timing.

Figure 18:
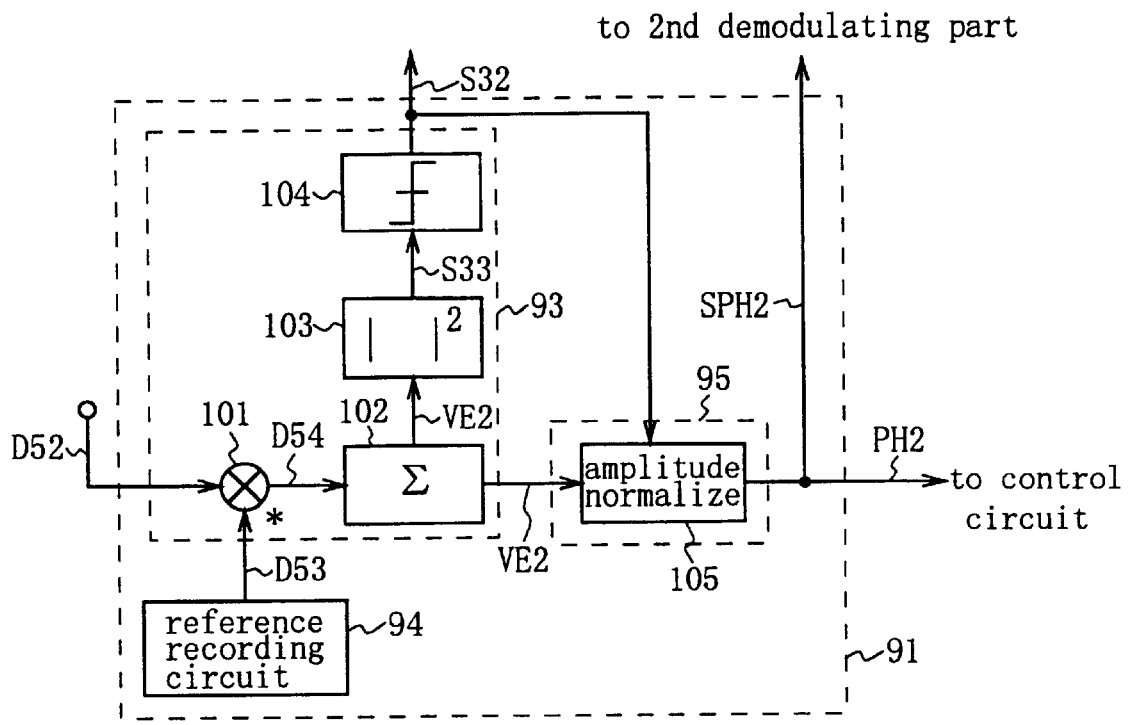
FIG. 18 is a block diagram showing the construction of the first demodulating part in the first receiver according to the second embodiment.

Here, the detailed construction of the first demodulating part 91 will be explained with referring to FIG. 18. As shown in FIG. 18, the demodulating part 91 is composed of the correlation calculating circuit 93, the reference storage circuit 94, and the phase offset detecting circuit 95. The correlation calculating circuit 93 inputs the symbol of the preamble data of the symbol stream D52 to the fifth multiplier 101 through the first input terminal 65A of the selection switch 65.

The fifth multiplier 101 complex-multiplies the symbol of the preamble data of the input symbol stream D52 and the conjugate value of the reference symbol stream D53 which is read out from the reference storage circuit 94, so that the phase for the information of preamble data is removed to output the symbol stream D54 having only the phase offset component due to the time lag of the reception timing to a total sum circuit 102.

Figure 19:
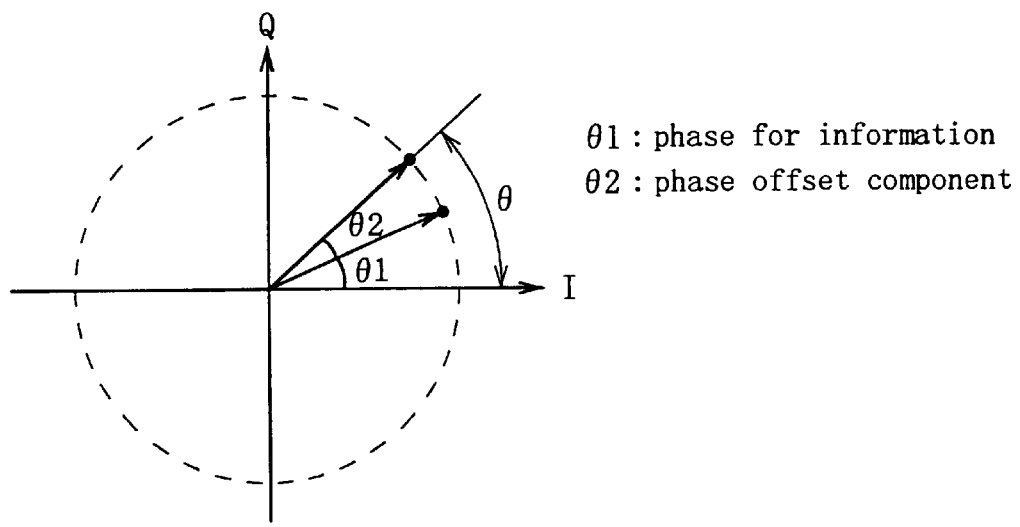
FIG. 19 is a schematic diagram showing the operation principle of a multiplier in the first receiver according to the second embodiment.

As shown in FIG. 19, the theory of the processing in the fifth multiplier 101 is that the phase θ1 for the information is removed from the phase component θ which is present in the symbol of the preamble data of the received symbol stream D52, to form the symbol stream D54 which only has the phase offset component θ2 due to the time lag of the reception timing. In connection, the symbol stream D52 is a symbol which has been already differential-demodulated, and the differential phase component has been already removed, so that it is not needed to be considered here.

The total sum circuit 102 cumulatively adds the I component and Q component of each symbol of the symbol stream D54 respectively, and outputs this as a vector VE2 (complex number) composed of the phase and the amplitude to a first square circuit 103 and the phase offset detecting circuit 95. In connection, the phase of the vector VE2 is the average value, and the amplitude is the accumulated total value.

The first square circuit 103 squares the accumulated amplitude component of the vector VE2 to take out the signal electricity (real number), and the signal electricity S33 is output to a first comparing circuit 104 as a correlative value. The first comparing circuit 104 compares the signal electricity S33 with a predetermined threshold value, and outputs the control signal S32 to the FIFO buffer 96 of the second demodulating part 92 and outputs it to the phase offset detecting circuit 95 when the signal electricity S33 exceeds the threshold value.

The phase offset detecting circuit 95 is composed of an amplitude normalizing circuit 105. When the control signal S32 is input from the first comparing circuit 104, the phase offset detecting circuit 95 normalizes the amplitude component of the vector VE2 to "1" to take out the phase offset component PH2 of one sub-carrier. The phase offset component PH2 is output to the control circuit (not shown) for controlling the entire operation of the base station, and at the same time, the symbol SPH2 having the phase offset component PH2 is formed to be output to the fourth multiplier 97 of the second demodulating part 92.

The second demodulating part 92 (FIG. 17) is a demodulating part for demodulating the message data. The symbols corresponding to the message data of the symbol stream D52 sent from the second input terminal 65B of the selection switch 65 is successively input to the FIFO buffer 96 until the symbols are stored for one slot. Each symbol of the symbol stream D52 stored in the FIFO buffer 96, when receiving the control signal S32 from the correlation calculating circuit 93 of the first demodulating part 91, is successively read out to be input to the next fourth multiplier 97.

The fourth multiplier 97 complex-multiplies each symbol of the symbol stream D52 and the conjugate value of the symbol SPH2 having the phase offset component PH2 input from the phase offset detecting circuit 95, so that the phase offset component is removed from each symbol of the symbol stream D52 to be output to the QPSK demodulating circuit 98. In this way, the phase offset component included in the symbol corresponding to the message data of the symbol stream D52 is removed.

The QPSK demodulating circuit 98 performs the QPSK modulation on each symbol of the symbol stream D52 that the phase offset component is removed, so as to convert it into the information bit stream, which is output to an error detection and correction circuit 99. The error detection and correction circuit 99 detects the errors of the information bits stream based on the error detection and correction bits included in the information bit stream, and corrects errors. The information bit stream which is decoded correctly as a result is output as message data DM4.

(2-8) Operations and Effects

In the above construction, in the transmitter 80 of the communication system, the symbols (P) of the preamble data DP2 and the symbols (I) of the message data DM3 are alternately selected, so as to form such symbol stream D42 that the symbols of the high priority preamble data DP2 and the symbols of the low priority message data are alternately lined as shown in FIG. 12.

Then, the transmitter 80 differential-modulates each transmission symbol currently input using one previous transmission symbol as a reference symbol, regardless of the transmission symbol of the preamble data DP2 and the transmission symbol of the message data, to form the differential symbol stream D43. The transmitter 80 then performs the inverse high-speed Fourier transform processing on the differential symbol stream D43 to assign a symbol to each of a plurality of sub-carriers C2 to C22. In this case, since the transmission symbols of the preamble data and the transmission symbols of the message data are alternately positioned in the differential symbol stream D43, the symbols of the preamble data and the symbols of the message data are alternately positioned also on the frequency axis.

More specifically, the transmission symbols of the preamble data are superimposed on the odd-numbered sub-carriers C3, C5, C7, C9, C11, C13, C15, C17, C19, and C21, and the transmission symbols of the message data are superimposed on the even-numbered sub-carriers C2, C4, C6, C8, C10, C12, C14, C16, C18, C20, and C22. Thus formed transmission symbol stream D44 is transmitted via the antenna 50 as the transmission signal S30 after a predetermined transmission processing is performed.

On the other hand, in the receiver 90, the transmission signal S30 transmitted from the transmitter 80 is received by the antenna 61 at the reception timing having time lag due to transfer delay. A predetermined reception processing is performed on the transmission signal S30 to obtain the reception symbol stream. The window processing is performed on the reception symbol stream at a normal timing to obtain the reception symbol stream D50. At this time, the transmission signal S30 for two time slots is transmitted, so that the window processing is only performed with a normal timing to extract the transmission signal S20 for one cycle certainly.

The receiver 90 then performs the high-speed Fourier transform on the reception symbol stream D50 so as to perform the signal conversion from on the frequency axis to the time axis, and further performs the differential demodulation to form the symbol stream D52. The symbol stream D52 in which the differential phase component is removed from each symbol is output.

Next, the receiver 90 alternately changes the connection by the first selection switch 65, to output the symbols of preamble data of the symbol stream b52 to the first modulating part 91, and to output the symbols of message data to the second modulating part 92.

The receiver 90 calculates the correlative value between the symbols corresponding to the preamble data of the symbol stream D52 and the symbols of the reference symbol stream D53 by the correlation calculating circuit 93. If the correlative value exceeds a predetermined threshold value, the correlation calculating circuit 93 judges that the preamble data is received and outputs control signal S32 representing the start of demodulating the message data to the second demodulating part 92, and starts to demodulate the message data. The receiver 90 can start the demodulation of the message data only when it is judged that the preamble data is received by calculating the correlative value in the first demodulating part 91. Thereby, the processing amount in the second demodulating part 92 can be reduced remarkably.

Further, the first demodulating part 91 calculates vector VE2 from the symbol stream D52 by the correlation calculating circuit 93, and outputs this to the phase offset detecting circuit 95. The phase offset component PH2 detected by the phase offset detecting circuit 95 is output to the control circuit for controlling the entire operation of base station, and outputs the symbol SPH2 having the phase offset component PH2 to the second demodulating part 92. The base station thereby calculates the timing lag at the time of receiving by the control circuit as a time information t2, and informs the time information t2 to the portable telephone device, so that the time lag of the reception timing can be removed by performing the time alignment.

The second demodulating part 92, when the control signal S32 is input from the correlation calculating circuit 93, successively reads each symbol of the symbol stream D52 for one slot stored in the FIFO buffer 96, and complex-multiplies the symbol of the symbol stream D52 and the conjugate value of the symbol SPH2 having the phase offset component PH2 by the fourth multiplier 97 to remove the phase offset component. Thereafter, the QPSK demodulation and the error detection and correction are performed on it, so as to output the information bit stream which is decoded correctly as message data DM4.

In this way, in the transmitting side of the communication system of the second embodiment, the symbols composed of the information bits of the preamble field and the symbols composed of the information bits of the information field are alternately positioned, and each symbol of the differential symbol stream D43 obtained by differential-modulating using one previous symbol as a reference symbol is assigned to sub-carrier, so that the transmission signal S30, in which the sub-carriers on which the symbols of preamble data are superimposed and the sub-carriers on which the symbols of message data are superimposed are alternately positioned on the frequency axis, is transmitted at least for two time slots.

At the receiving side, even when the transmission signal S30 is received at the reception timing having time lag due to transfer delay, the transmission signal S30 for two time slots or more is transmitted, so that the window processing is only performed for one modulation time on the transmission signal S30 at a normal timing, to extract certainly the transmission signal S30 for one cycle. Therefore, if it is not sure when the transmission signal S30 arrives, the demodulation processing can be performed at a normal timing so as to reduce the processing amount.

Further, at the receiving side, the high-speed Fourier transform processing is performed on the received reception signal S31 to obtain the reception symbol stream D51 in which the symbols of the preamble data and the symbols of the message data are alternately positioned on the time axis, and the phase offset component PH2 between sub-carriers is detected from symbols of the preamble data among the symbol stream D52 which is obtained by differential-demodulating the reception symbol stream D51 and the preamble data can be decoded accurately based on the signal component of the symbol of the preamble data. When the existence of the message data is confirmed by the detection of the preamble data, the phase offset component PH2 is removed from the phase components of the symbol of the message data among the symbol stream D52 which has been differential-demodulated, and it is QPSK demodulated so that the message data can be decoded accurately. Thereby, since the demodulating processing is performed only when the processing in accordance with the priority is performed to confirm the existence of the message data, the useless processing amount can be reduced.

According to the above construction, in the transmitter 80 of the communication system, the symbols of the preamble data and the symbols of the message data are alternately positioned and each symbol of the differential symbol stream D43 which is obtained by differential-modulating based on the differential phase between the symbol of the preamble data and the symbol of one previous message data is assigned to sub-carrier, so as to transmit the transmission signal S30 for two time slots, that the sub-carriers on which the preamble data are superimposed and the sub-carriers on which the message data are superimposed are alternately positioned. Even if the transmission signal S30 is received at the reception timing having time lag due to transfer delay in the receiver 90, the window processing is only performed on the reception signal S31 at the normal timing for one modulation time to extract certainly the reception symbol stream D50 for one cycle. Thereby, even if the transmitting timing is asynchronous with the receiving timing conventionally, the processing amount can be reduced since the useless processing such as demodulating for each very short time is not needed.

Further, in the receiver 90, the phase offset component PH2 is detected from the symbols of the preamble data among the symbol stream D52 obtained by the high-speed Fourier transforming and differential-demodulating the reception symbol stream D50 extracted, and the preamble data is decoded accurately based on the signal component of the symbol of the preamble data. When it is judged that the preamble data is received, the phase offset component is removed from the phase components of the symbol of the message data from the symbol stream D52, and thereafter, the message data can be decoded accurately. Thereby, since the demodulating processing of the message data starts after the existence and the attribute of the message data is confirmed, the processing amount at the receiving side can be reduced.

Further, in the receiver 90, when the existence and the attribute of the message data are confirmed, the conjugate value of the symbol SPH2 having the phase offset component PH2 detected from the symbol of the preamble data is complex-multiplied with the symbol corresponding to the message data read out from the FIFO buffer 96, so that the phase offset components that each symbol of the symbol stream D52 has are all removed and then the message data DM4 can be decoded accurately to be output. Thereby, the processing in accordance with the priority is performed to decode the data accurately.

As a result, in the communication system, even when the preamble data DP2 including the attribute of the message and the message data DM3 are transmitted at the same time with the multi-carrier method, the high priority preamble data is decoded to confirm the existence and attribute of the message data with a simple construction, and then the message data can be decoded accurately.

(2-9) The construction of Second Receiver

Figure 20:
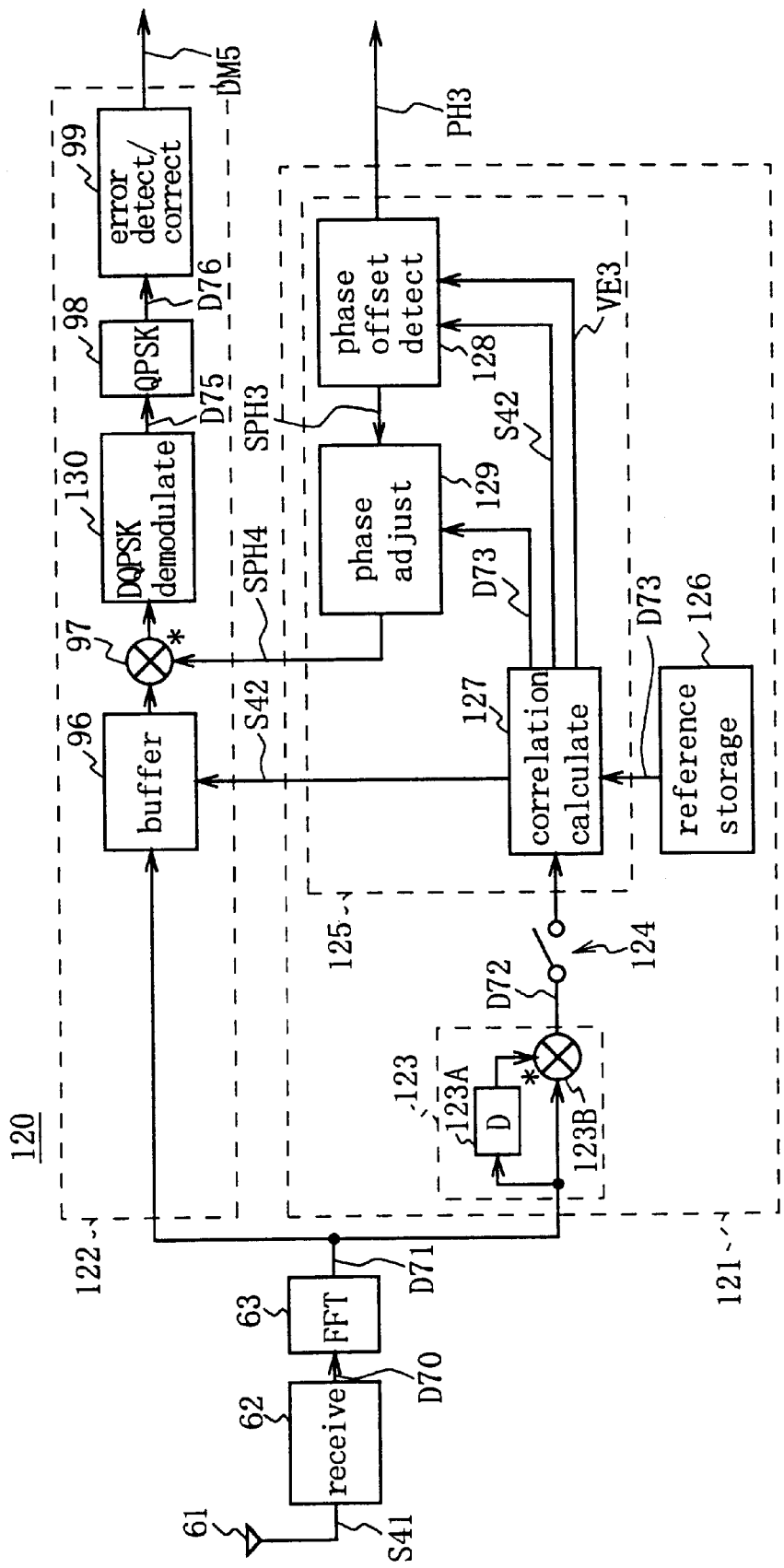
FIG. 20 is a block diagram showing the construction of the second receiver for control data according to the second embodiment.

Next, the second receiver for receiving the transmission signal S30 transmitted via the random access channel described above will be explained. In FIG. 20 where the portions corresponding to those of FIG. 17 are designated with the same reference numerals, 120 shows the second receiver for receiving the transmission signal S30 transmitted via the random access channel as a whole. The second receiver 120, which is provided in the base station similarly to the first receiver 90, receives the transmission signal S30 being control data transmitted from the portable telephone device. In addition, not only the transmitter 80 but also the receiver 120 is provided in the portable telephone device, and not only the receiver 120 but also the transmitter 80 described above is provided in the base station.

The receiver 120 receives the transmission signal S30 transmitted from the transmitter 80 by the antenna 61, and inputs this to the receiving circuit 62 as reception signal S41. The receiving circuit 62 performs the filtering processing and then frequency conversion processing on the reception signal S41 to take out baseband signal.

The receiving circuit 62 performs the analog-to-digital conversion processing on the baseband signal to obtain reception symbol stream, and performs the window processing on the reception symbol stream at a normal timing for one modulation time, and normalizes each symbol with the total value of the signal electricity for one modulation time (or the total value of the amplitude). Then, the resultant reception symbol stream D70 is output to the high-speed Fourier transform circuit 63.

Here, the control data for two time slots is transmitted from the transmitter 80 as the transmission signal S30, so that the window processing is only performed at a normal timing to extract the transmission signal S30 for one time slot certainly. In this case, when the receiver 120 receives the transmission signal S30, the time lag of receiving timing has already occurred and thereby the phase rotation (phase offset component) occurs in each symbol of the reception symbol stream D70. In connection, the reception symbol stream D70 is a symbol stream before the Fourier transform is performed, and is a symbol stream that symbols are lined on the frequency axis.

The high-speed Fourier transform circuit 63 performs the high-speed Fourier transform processing on the reception symbol stream D70 to generate such signal that the symbols lined on the frequency axis are lined on the time axis. More specifically, the high-speed Fourier transform circuit 63 takes out the symbols superimposed on respective sub-carriers, and forms the reception symbol stream D71 in which the symbols are lined on the time axis. The reception symbol stream D71 formed by the processing of the high-speed Fourier transform circuit 63 is input to the first demodulating part 121 at a lower stage and the second demodulating part 122 at an upper stage.

Here, the second demodulating part 122 stores all of the symbols (all odd-numbered and even-numbered symbols) of the reception symbol stream D71 corresponding to one slot in the FIFO buffer 96. However, the differential demodulation is not performed on the reception symbol stream D71 and the differential phase component between symbols is included in each symbol. Also, in addition to the differential phase component, the phase rotation (phase offset component) similarly occurs on all symbols due to the time lag of the reception timing, and the phase offset component is cumulative adding in the order of the symbols.

For example, the symbol of the sub-carrier C1 has the phase offset component of $\pi/n$, the symbol of the sub-carrier C2 has the phase offset component of $2\pi/n$, the symbol of the sub-carrier C3 has the phase offset component of $3\pi/n$, and after this, cumulative adding is similarly performed and the symbol of the sub-carrier C22 has the phase offset component of $22\pi/n$. In connection, the phase offset components similarly occurs on all symbols due to time lag of the reception timing, so that the phase offset components between sub-carriers are all $\pi/n$.

On the contrary, the first demodulating part 121 is a demodulating part for demodulating the preamble data of the reception symbol stream D71, and inputs the reception symbol stream D71 which has been input to the third delay circuit 123A of the differential demodulating circuit 123 and the sixth multiplier 123B respectively. The sixth multiplier 123B complex-multiplies the symbol currently input and the conjugate value of one previous symbol supplied through the third delay circuit 123A, so as to perform the differential demodulation on the reception symbol stream D71. As a result, the symbol stream D72 in which the differential phase component held in each symbol is removed is formed to be output to the switch 124.

The switch 124 receives the symbol stream D72 at the input terminal, and connects a terminal when the symbol stream D72 is the symbols which are assigned to the odd-numbered sub-carriers C1, C3, C5, C7, C9, C11, C13, C15, C17, C19, and C21, so as to output only symbols corresponding to the preamble data to a correlative calculating part 125. In the reference storage circuit 126, all of the reference symbol stream D73 which can be considered as symbol stream of the preamble data peculiar for each base station and the information bit stream being the original, and the attribute information of the preamble data are stored plurally.

By the way, when a plurality of preamble data are assigned to the base station for the purpose of giving the attribute to the message data, the correlation calculating circuit 125 calculates the correlative value to all of the reference symbol stream stored in the reference storage circuit 126, and judges that the preamble data having a predetermined attribute is received when the correlative value exceeds the threshold value. The receiver 120 may obtain the attribute of the message data by detecting the preamble data. In connection, when the correlative value to a plurality of preamble series exceeds a predetermined threshold value, the receiver 120 judges that the preamble data having the largest correlative value is received.

The correlation calculating part 125 is composed of a correlative calculating circuit 127, a phase offset detecting circuit 128 and a phase adjusting circuit 129. The correlative calculating circuit 127 calculates the correlative value (in this case, the electricity of the symbol stream D72) between the symbol of the preamble data of the symbol stream D72 and the symbol of the reference symbol stream D73 read out from the reference storage circuit 126. If the correlative value exceeds a predetermined threshold value, the correlation calculating circuit 127 judges that the preamble data is received (that is, judges that the message data exists) and outputs control signal S42 representing the start of demodulating the message data to the second demodulating part 122. In connection, the correlation calculating circuit 127 calculates the correlative value to the reference symbol stream D73 using the symbol stream D72 after each symbol is normalized by the receiving circuit 62, so that the correct correlative value can be calculated.

Also, the correlative calculating circuit 127 takes out the symbol of the symbol stream D72, and outputs the vector VE3 obtained by cumulatively adding the I component and Q component of each symbol to the phase offset detecting circuit 128. In addition, the correlation calculating circuit 127 outputs the reference symbol stream D73 read out from the reference storage circuit 126 to the phase adjusting circuit 129 as it is.

When the control signal S42 is input from the correlative calculating circuit 127, the phase offset detecting circuit 128 detects the phase offset component PH3 ($\pi/n$) between sub-carriers due to time lag of the reception timing based on the input vector VE3, and outputs this to the control circuit (not shown) for controlling the entire operation of base station, and generates the symbol SPH3 having the phase offset component PH3 to be output to the phase adjusting circuit 129.

The base station calculates the delay time t3 due to the timing lag at the time of receiving by the control circuit using the following equation:

[Eq. 3]

$$t3 = (\theta/2\pi) \times 1/f_{sc} \qquad (3)$$

$f_{sc}$: sub-carrier spacing (the frequency difference between sub-carriers)

based on the phase offset component PH3. The delay time t3 is informed to the portable telephone device via the transmitter 80. The portable telephone device advances the timing of a signal transmitted to the base station based on the delay time t3 (performs time alignment) to remove the time lag of reception timing.

The phase adjusting circuit 129 respectively generates the phase offset components in the even-numbered symbols input to the FIFO buffer 96 of the second demodulating part 122 and the symbol SPH4 having the same phase component as the phase component that each symbol has peculiarly to remove the phase offset components in the odd-numbered symbols and the differential phase component of the preamble data. They are output to the second demodulating part 122 and the fourth multiplier 97 successively.

Figure 21:
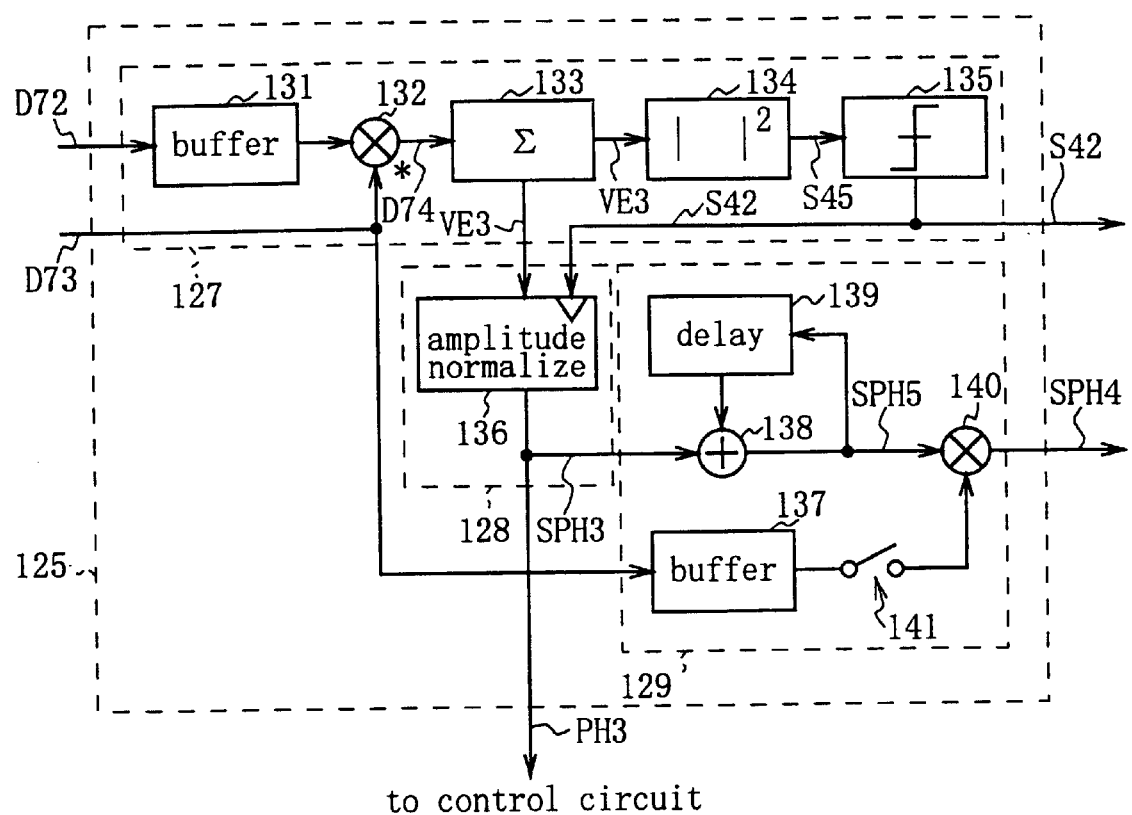
FIG. 21 is a block diagram showing the construction of a correlation calculating part in the second receiver according to the second embodiment.

Next, the internal construction of respective circuits 127 to 129 of the correlation calculating part 125 will be describe with referring to FIG. 21. As shown in FIG. 21, the correlation calculating circuit 127 inputs the symbol corresponding to the preamble data of the symbol stream D72 sent through the switch 124 (FIG. 20) to the FIFO buffer 131. When the symbol corresponding to the preamble data is stored for one slot, the FIFO buffer 131 reads out it successively by one symbol to be output to the eighth multiplier 132.

The eighth multiplier 132 complex-multiplies the symbol corresponding to the preamble data of the symbol stream D72 on which the differential demodulation is performed and the conjugate value of the symbol of the reference symbol stream D73 which is read out from the reference storage circuit 126, so that the phase for the information of preamble data is removed to output each symbol of the symbol stream D74 having only the phase offset component due to the time lag of the reception timing to a total sum circuit 133.

The total sum circuit 133 cumulatively adds the I component and Q component of each symbol in the symbol stream D74 respectively, and outputs this as a vector VE3 composed of the phase and the amplitude to the second square circuit 134 and the phase offset detecting circuit 128. In connection, the phase of the vector VE3 is the average value of each symbol and the amplitude is the accumulated total value. The second square circuit 134 squares the cumulatively added amplitude component of the vector VE3 (complex number) to take out the signal electricity (real number), and the signal electricity S45 is output to the second comparing circuit 135 as a correlative value.

The second comparing circuit 135 compares the signal electricity S45 with a predetermined threshold value, and outputs the control signal S42 to the FIFO buffer 96 of the second demodulating part 126 and outputs it to the phase offset detecting circuit 128 when the signal electricity S45 exceeds the threshold value.

The phase offset detecting circuit 128 is composed of an amplitude normalizing circuit 136. When the control signal S42 is input from the second comparing circuit 135, the phase offset detecting circuit 128 normalizes the amplitude component of the vector VE3 to "1" so as to take out the phase offset component PH3 between sub-carriers. The phase offset component PH3 is output to the control circuit (not shown) for controlling the entire operation of the base station, and at the same time, the symbol SPH3 having the phase offset component PH3 is formed to be output to the first adder 138 of the phase adjusting circuit 129.

The phase adjusting circuit 129 adds the symbol SPH3 input to the first adder 138 and the one previous symbol SPH3 obtained through the fourth delay circuit 139, to successively produce the symbol SPH5 having the phase offset component in accordance with each of all symbols in the order of symbol, which is output to the seventh multiplier 140. More specifically, the symbol SPH5 has the phase offset component that π/n is accumulative-added respectively in the order of symbol. The phase adjusting circuit 129 reads out all symbols (odd-numbered and even-numbered all symbols) of the reference symbol stream D73 stored in the FIFO buffer 137, and outputs the symbol of the reference symbol stream D73 (only the symbol corresponding to the preamble data) to the seventh multiplier 140 through the switch 141 every one timing.

Thus, when the switch 141 is on-state, the seventh multiplier 140 complex-multiplies the symbol SPH5 that the phase offset component is accumulated for each odd-numbered symbol and the symbol corresponding to the preamble data of the reference symbol stream D73, so as to form the symbol SPH4 that the phase offset component held in each symbol SPH5 and the differential phase component are added in the order of symbol, which is output to the fourth multiplier 97 of the second demodulating part 122 successively. Moreover, when the switch 141 is off-state, the seventh multiplier 140 outputs the symbol SPH5 that the phase offset component is accumulated for each even-numbered symbol to the fourth multiplier 97 of the second demodulating part 122 as it is as symbol SPH4.

The second demodulating part 122 (FIG. 20) reads out all symbols of the first symbol stream D71 from the FIFO buffer 96, which is output to the fourth multiplier 97. When the odd-numbered symbol of the first symbol stream D71 is input, the fourth multiplier 97 complex-multiplies the odd-numbered symbol and the conjugate value of the symbol SPH4, so as to remove all of the phase offset components and the differential phase that each odd-numbered symbol have respectively.

Further, when the even-numbered symbol of the first symbol stream D71 is input, the fourth multiplier 97 complex-multiplies the even-numbered symbol and the conjugate value of the symbol SPH4, so that the phase offset component that each even-numbered symbol respectively has is all removed. Thereby, in the condition that the phase difference between the symbol in the odd-numbered sub-carrier and the symbol in the previous even-numbered sub-carrier becomes "0", these symbols are output to the DQPSK demodulating circuit 130.

The DQPSK demodulating circuit 130 composes the odd-numbered symbol and one previous even-numbered symbol in the condition that the phase difference between the odd-numbered symbol and one previous even-numbered symbol becomes "0", to form one composed symbol successively. The differential demodulation is performed based on the phase difference between the adjacent composite symbols.

Figure 22:
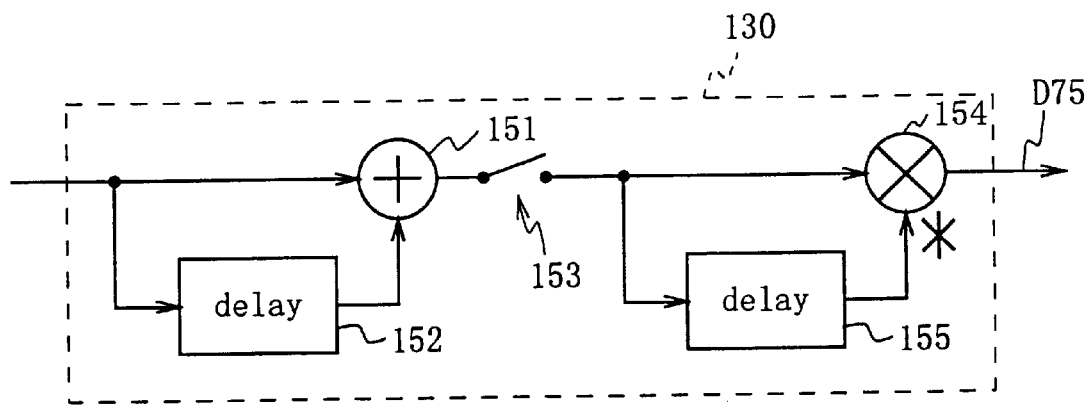
FIG. 22 is a block diagram showing the construction of a DQPSK demodulating circuit in the second receiver according to the second embodiment.

Actually, as shown in FIG. 22, the DQPSK modulating circuit 130 successively inputs the odd-numbered symbol having the phase difference "0" and one previous even-numbered symbol to the second adder 151 and the fifth delay circuit 152. The second adder 151 adds the odd-numbered symbol currently input and one previous even-numbered symbol supplied through the fifth delay circuit 152, to form the composite symbol, which is output to the input terminal of the switch 153.

Only in the case of the composite symbol which has been composed with a combination of odd-numbered symbol and one previous even-numbered symbol, the switch 153 turns on the terminal, and outputs it to the ninth multiplier 154 and the sixth delay circuit 155 respectively. In connection, in the case of the composite symbol which has been composed with a combination of even-numbered symbol and one previous odd-numbered symbol, the switch 153 turns off the terminal and does not output it. The ninth multiplier 154 complex-multiplies the composite symbol currently input and the conjugate value of one previous composite symbol supplied through the sixth delay circuit 155, so that the differential demodulating processing is performed to form the symbol stream D75.

More specifically, the DQPSK demodulating circuit 130 composes the symbol of the odd-numbered sub-carrier C3 and the symbol of one previous even-numbered sub-carrier C2 to form one composite symbol, and composes the symbol of the next odd-numbered sub-carrier C5 and the symbol of one previous even-numbered sub-carrier C4 to form one composite symbol. After such processing is successively performed, the symbol stream D75 formed by performing the differential demodulation based on the phase difference between adjacent two composite symbols is output to the QPSK demodulating circuit at the next stage.

By the way, the message data in the conventional random access channel modulates the information based on the differential phase between odd-numbered sub-carrier and even-numbered sub-carrier. However, in the present invention, the phase difference between sub-carriers C2 and C3, C4 and C5, C6 and C7, C8 and C9, C10 and C11, C12 and C13, C14 and C15, C16 and C17, C18 and C19, C20 and C21 are "0", so that the symbols of the phase difference "0" are respectively composed to form one composite symbol. Differential-demodulating based on the differential phase of these adjacent composite symbols makes it possible to take out one symbol information as a message data using four symbols. Comparing the conventional differential demodulating processing for taking out the one symbol information using two symbols, the information is taken out using twice as many symbols as conventional one. Thereby, since the change of the amplitude due to noise is averaged, the characteristics of noise-resistance can be improved.

The QPSK demodulating circuit 98 performs the QPSK demodulating processing on the symbol stream D75 to convert it to the information bit stream D76, which is output to the error detection and correction circuit 99. The error detection and correction circuit 99 detects the errors of the information bits stream based on the error detection and correction bits included in the information bit stream D76, and corrects the errors. The information bit stream which is decoded correctly as a result is output as message data DM5.

(2-10) Operations and Effects

In the above construction, the first demodulating part 121 differential-demodulates the reception symbol stream D71 input from the high-speed Fourier transform circuit 63 with the differential demodulating circuit 123, and thereafter, successively outputs the symbol corresponding to the preamble data of the symbol stream D72 to the correlation calculating circuit 127 of the correlation calculating part 125 through the switch 124. The correlation calculating circuit 127 calculates the correlative value between each symbol of the input symbol stream D72 and each symbol of the reference symbol stream D73 read out from the reference storage circuit 126. If the correlative value exceeds a predetermined threshold value, the control signal S42 is output to the FIFO buffer 96 of the second demodulating part 122 so that the symbol of the first symbol stream D71 stored in the FIFO buffer 96 is successively read out to be demodulated. The receiver 120 can start demodulation based on the control signal S42. Thus, the second demodulating part 122 can start demodulation only when the existence and attribute of the message data are confirmed, so that the processing amount can be reduced.

At this time, the correlation calculating part 125 takes out the phase offset component PH3 between sub-carriers and outputs this to the control circuit. The base station can calculates time lag of the reception timing by the control circuit as time information t3. The base station transmits the time information t3 to the portable telephone device through the transmitter 80, and the portable telephone device adjusts the transmitting timing based on the time information t3 to perform time alignment.

Further, the correlation calculating part 125 generates, by the phase adjusting circuit 129, the phase offset component that each odd-numbered symbol stored in the FIFO buffer 96 of the second demodulating part 122 has and the differential phase, and the symbol SPH4 in accordance with the phase offset component that each even-numbered symbol has. They are output to the fourth multiplier 97 successively. The fourth multiplier 97 of the second demodulating part 122 complex-multiplies each symbol stored in the FIFO buffer 96 and the conjugate value of the symbol SPH4, so as to remove all of the phase offset component that each odd-numbered symbol has and the differential phase, and the phase offset component that each previous even-numbered symbol has.

In the second demodulating part 122, since the phase difference between odd-numbered symbols and previous even-numbered symbols are "0", the DQPSK demodulating circuit 130 composes the symbols whose phase difference is "0" to form one composite symbol and performs the differential demodulating processing between adjacent composite symbols, so that the information of one symbol message data can be taken using four symbols totally. Thereby, the characteristics of noise-resistance (approximately 3 dB) can be improved comparing to the first receiver 90.

According to the above construction, in the second receiver 120 of this invention, after the first demodulating part 121 judges that the preamble data is received, the second demodulating part 122 starts demodulation of message data, in the condition that there is no phase difference between the odd-numbered symbol of the reception symbol stream D71 and the even-numbered symbol, composes respective symbols to form one composite symbol, and differential-demodulates based on the differential phase of adjacent composite symbols. Thereby, the demodulation starts after the existence of message data is confirmed, and the message data can be decoded accurately, and simultaneously the characteristics of noise-resistance can be improved.

(3) Other Aspects of the Implementation

Figure 23:
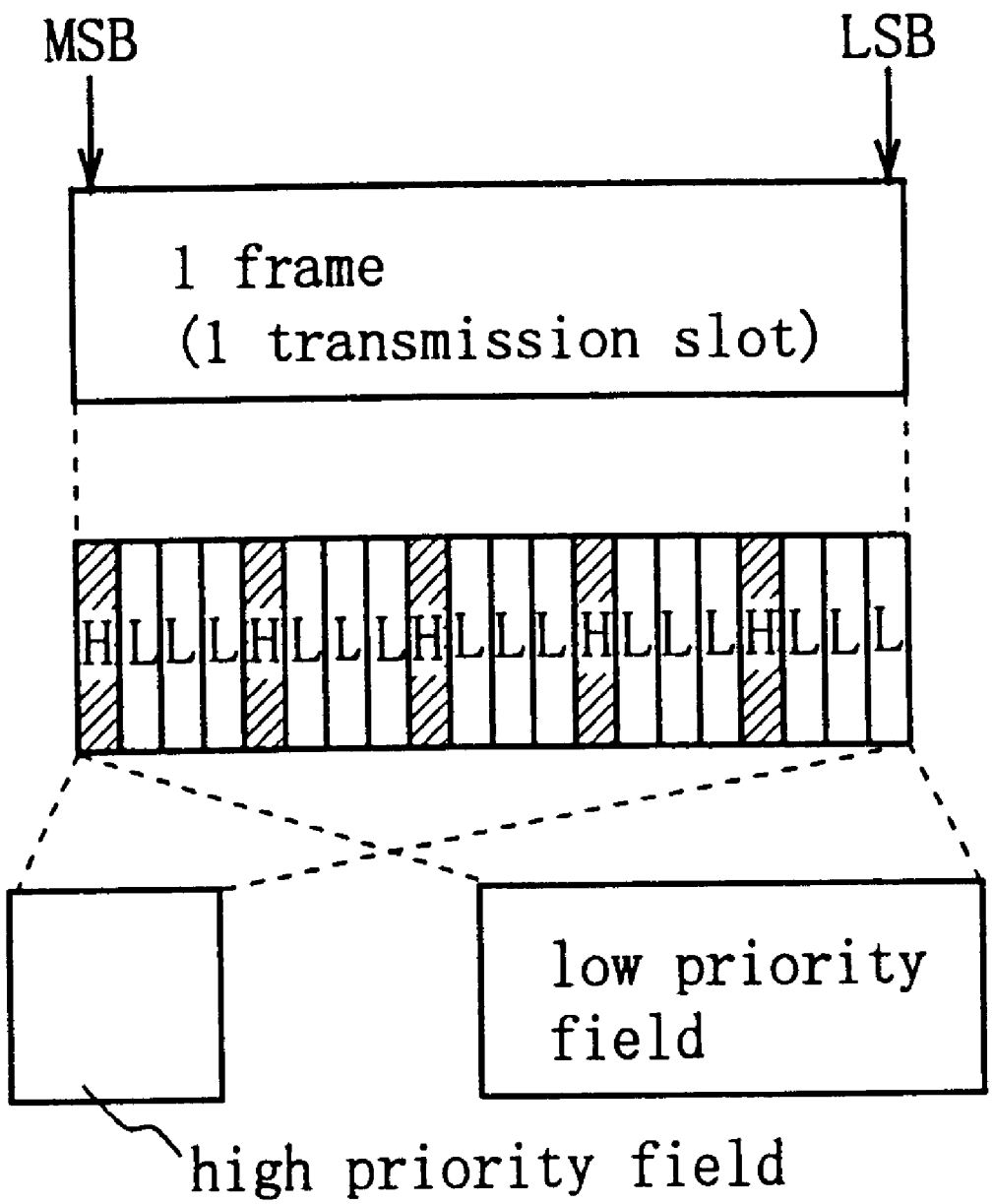
FIG. 23 is a schematic diagram showing the frame structure according to other embodiments.

The first and second embodiments described above have been dealt with the case where, as shown in FIG. 8, a half of sub-carriers are used as the sub-carriers for the high priority data or the preamble data, and the remaining sub-carriers are used as the sub-carriers for the low priority data or the message data. However, this invention is not limited to this, but as shown in FIG. 23, the ratio of the sub-carriers for the high priority data to the sub-carriers of the low priority data can be arbitrarily set and positioned. In this case, the change operation of the selection switch in the transmitter and receiver is only changed in accordance with the ratio, and the same effects as the first and second embodiments can be obtained.

Further, the second embodiment has been dealt with the case where this invention is applied to the case of transmitting the control data composed of preamble data and message data in the random access channel of the portable telephone system. However, this invention is not limited to this, but can be applied to the case of transmitting the control data composed of preamble data and message data in the initial acquisition channel of the portable telephone system. In addition, the initial acquisition channel is a control channel necessary to receive the control channel (BCCH) on which the system information of the portable telephone system flows. For example, when the portable telephone system is turned on, the portable telephone system firstly receives the initial acquisition channel transmitted from the base station to obtain the information data relating to the control channel (BCCH), and receives the control channel (BCCH) based on the information data to perform a processing for position registering. In short, the channel to obtain information promptly can detect the high priority preamble data promptly by applying this invention, so that the same effect as the case described above can be obtained.

Further, the first and second embodiments described above have been dealt with the case where the error detection and correction bits are not added to the high priority data and preamble data. However, this invention is not limited to this, but the error detection and correction bits can be added to the high priority data and preamble data for several frames.

Further, the first and second embodiments described above have been dealt with the case where the error detection and correction bits are added to the low priority data and message data. However, this invention is not limited to this, but the error detection and correction bits can not be added to the low priority data and message data if errors do not arise.

Further, the first and second embodiments described above have been dealt with the case where the QPSK modulation is used as a modulating method. However, this invention is not limited to this, but other modulating methods for putting the information component on the phase, such as the binary phase shift keying (BPSK) or the 8PSK can be also applied.

Further, the first and second embodiments described above have been dealt with the case where the number of sub-carriers used for the multi-carrier communication is 24. However, this invention is not limited to this, but other number of the sub-carriers can be used.

Further, the first and second embodiments described above have been dealt with the case where the high priority symbols are assigned to the odd-numbered sub-carriers and the low priority symbols are assigned to the even-numbered sub-carriers. However, this invention is not limited to this, but the opposite case can be applied. In this case, the switch only may change oppositely.

Further, the second embodiment described above has been dealt with the case where the transmission signal S30 for two time slots is transmitted. However, this invention is not limited to this, but if the transmission signal S30 for one time slot can be extracted certainly by performing the window processing at a normal timing in the receiving side, the transmission signal S30 having various number of time slots, more than two time slots, can be transmitted.

Further, the first embodiment described above has been dealt with the case where the transmitting means consisting of the encoder 41, the error correction bit adding circuit 42, the QPSK modulating circuits 43, 45, the differential modulating circuit 47, the inverse high-speed Fourier transform circuit 48, and the transmitting circuit 49 is provided and the high priority symbols and the low priority symbols are positioned alternately. The high priority symbol is differential-modulated based on the differential phase between the high priority symbol and the one previous low priority symbol to obtain the differential symbol stream, and each symbol of the differential symbol stream is assigned to sub-carrier. Thereby, the transmission signal in which the sub-carriers on which the high priority symbols are superimposed and the sub-carriers on which the low priority symbols are superimposed are positioned alternately is transmitted. However, this invention is not only limited to this, but the transmitting means having other combination of circuits can be provided.

Further, the first embodiment described above has been dealt with the case where in the receiver 60, the antenna 61 and the receiving circuit 62 as a receiving means, the high-speed Fourier transform circuit 63 as a signal conversion processing means, the differential demodulating circuit 64 as a differential demodulating means, the first demodulating circuit 66 as a first demodulating means, and the second demodulating circuit 67 as a second demodulating means are provided. However, this invention is not limited to this, but a receiving means, a signal conversion processing means, a differential demodulating means, a first demodulating means, and a second demodulating means which have other combination of circuits can be provided.

Further, the second embodiment described above has been dealt with the case where in the receiver 120, the antenna 61 and the receiving circuit 62 as a receiving means, the high-speed Fourier transform circuit 63 as a signal conversion processing means, the differential demodulating circuit 123 as a first differential demodulating means, the correlation calculating circuit 127 as a demodulating means, the phase offset detecting circuit 128 as a phase offset detecting means, the phase adjusting circuit 129 and the fourth multiplier 97 as a phase removing means, the DQPSK demodulating circuit 130 as a second differential demodulating means are provided. However, this invention is not limited to this, but a receiving means, a signal conversion processing means, a first differential demodulating means, a demodulating means, and a phase offset detecting means, a phase removing means and a second demodulating means which have other combination of circuits can be provided.

Further, the second embodiment described above has been dealt with the case where the control data is transmitted from the portable telephone device to the base station through the random access channel. However, this invention is not only limited to this, but also the control data can be transmitted from the base station to the portable telephone device through the initial acquisition channel.

Furthermore, the second embodiment described above has been dealt with the case where this invention is applied to the portable telephone system. However, this invention is not only limited to this, but also if this invention is applied to other cellular radio communication system such as automobile telephone system, the same effects as the above case can be obtained.

As stated above, according to the present invention, in the communication method for transmitting the high priority data and the low priority data at the same time using a plurality of sub-carriers, at the transmitting side, the high priority symbols composed of the information bits of the high priority data and the low priority symbols composed of the information bits of the low priority data are alternately positioned, and based on the differential phase between the high priority symbol and one previous low priority symbol, each symbols of the differential symbol stream obtained by differential-modulating the high priority symbol is assigned to sub-carrier. Thereby, the transmission signal in which the sub-carriers on which the high priority symbols are superimposed and the sub-carriers on which the low priority symbols are superimposed are positioned alternately is transmitted. At the receiving side, when the transmission signal is received at a reception timing having time lag due to the transfer delay, a predetermined reception processing is performed on the received reception signal to obtain the reception symbol stream that the high priority symbols and the low priority symbols are alternately lined on the time axis. The phase offset component is detected from the high priority symbol of the symbol stream where from the differential phase is removed which is obtained by differential-demodulating the reception symbol stream, and the high priority data is decoded based on the signal component of the high priority symbol. After the phase offset component is removed from the phase components of the low priority data of the symbol stream, the low priority data is decoded. Thereby, the high priority data is decoded accurately, and the phase offset component due to the transfer delay is removed to decode the low priority data accurately. In this way, in the communication of the multi-carrier method, even when the high priority data and the low priority data are transmitted at the same time, the processing in accordance with the priority can be performed with a simple construction and data can be decoded accurately.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication method for transmitting high priority data and low priority data at a same time using a plurality of sub-carriers, comprising the steps of:

transmitting on a transmitting side a transmission signal wherein high priority symbols composed of high priority information bits of said high priority data and low priority symbols composed of low priority information bits of said low priority data are positioned alternately, and each symbol of a differential symbol stream obtained by differential-modulating said high priority symbols based on a differential phase between a high priority symbol and one previous low priority symbol is assigned to a sub-carrier for alternately positioning high priority sub-carriers whereon said high priority data is superimposed and low priority sub-carriers whereon said low priority data is superimposed;

performing at a receiving side when said transmission signal is received at a reception timing having time lag due to transfer delay a predetermined reception processing on a received reception signal for obtaining a reception symbol stream whereon said high priority symbols and said low priority symbols positioned alternately on a time axis are aligned:

detecting at said receiving side a phase offset component from said high priority symbols of said reception symbol stream wherein a differential phase is removed, said differential phase being obtained by differential-demodulating said reception symbol stream;

decoding at said receiving side said high priority data based on a signal component of said high priority symbols; and decoding at said receiving side said low priority data after said phase offset component is removed from said low priority symbols of said reception symbol stream.

2. The communication method according to claim 1, further comprising the step of transmitting at said transmitting side said transmission signal for at least two time slots.

3. The communication method according to claim 1, further comprising the steps of:

calculating at said receiving side said time lag based on said phase offset components; and transmitting said time lag to said transmitting side.

4. The communication method according to claim 1, wherein said low priority data is predetermined message data, and said high priority data is preamble data representing an existence and an attribute of said predetermined message data, and further comprising the steps of:

detecting at said receiving side said preamble data based on said signal component of said high priority symbols of said reception symbol stream for confirming said existence and said attribute of said message data; and decoding at said receiving side said message data.

5. The communication method according to claim 1, further comprising the step of prohibiting addition of error detection bits and error correction bits to said high priority data.

6. The communication method according to claim 1, further comprising the step of prohibiting addition of error detection bits and error correction bits are not added to said high priority data and said low priority data.

7. A transmitter for transmitting high priority data and low priority data at a same time using a plurality of sub-carriers, said transmitter comprising:

transmitting means for transmission of a transmission signal wherein high priority symbols composed of high priority information bits of said high priority data and low priority symbols composed low priority of information bits of said low priority data are positioned alternately, and each symbol of a differential symbol stream obtained by differential-modulating said high priority symbols based on a differential phase between a high priority symbol and one previous low priority symbol is assigned to a sub-carrier, for alternatively positioning high priority sub-carriers whereon said high priority data is superimposed and low priority sub-carriers whereon said low priority data is superimposed.

8. The transmitter according to claim 7, wherein said transmitting means transmits said transmission signal for at least two time slots.

9. The transmitter according to claim 7, wherein said low priority data is predetermined message data, and said high priority data is preamble data representing an existence and an attribute of said message data.

10. A transmitting method for transmitting high priority data and low priority data at a same time using a plurality of sub-carriers, comprising the steps of:

transmitting a transmission signal wherein high priority symbols composed of high priority information bits of said high priority data and low priority symbols composed of low priority information bits of said low priority data are positioned alternately, and each symbol of a differential symbol stream obtained by differential-modulating said high priority symbols based on a differential phase between a high priority symbol and one previous low priority symbol is assigned to a sub-carrier; and alternately positioning high priority sub-carriers whereon said high priority data is superimposed and low priority sub-carriers whereon said low priority data is superimposed.

11. The transmitting method according to claim 10, further comprising the step of transmitting said transmission signal for at least two time slots.

12. The transmitting method according to claim 10, wherein said low priority data is predetermined message data, and said high priority data is preamble data representing an existence and an attribute of said message data.

13. A receiver for receiving a transmission signal transmitted from a transmitter for transmitting high priority data and low priority data at a same time using a plurality of sub-carriers at a reception time having a time lag due to a transfer delay, said receiver comprising:

receiving means for receiving said transmission signal wherein high priority symbols composed of high priority information bits of said high priority data and low priority symbols composed of low priority information bits of said low priority data are positioned alternately, and each symbol of a differential symbol stream obtained by differential-modulating said high priority symbols based on a differential phase between a high priority symbol and one previous low priority symbol is assigned to a sub-carrier for alternately positioning high priority sub-carriers whereon said low priority data is superimposed;

signal conversion processing means for performing a predetermined conversion processing on a reception signal received by said receiving means for converting said reception signal into a reception symbol stream wherein said high priority symbols and said low priority symbols positioned alternately on a time axis are aligned;

differential demodulating means for differential-demodulating said reception symbol stream for forming said reception symbol stream wherein a differential phase is removed;

first demodulating means for detecting a phase offset component from said high priority symbols of said reception symbol stream and for decoding said high priority data based on a signal component of said high priority symbols; and second demodulating means for decoding said low priority data after said phase offset component is removed from said low priority data of said reception symbol stream.

14. The receiver according to claim 13, further comprising control means for calculating said time lag based on said phase offset component for transmission of said time lag to said transmitter.

15. The receiver according to claim 13, wherein said low priority data is predetermined message data, said high priority data is preamble data representing an existence and an attribute of said message data, said preamble data is decoded by said first demodulating means for confirming said existence and said attribute of said message data, and said message data is decoded by said second demodulating means.

16. A receiver for receiving a transmission signal transmitted from a transmitter for transmitting high priority data and low priority data at a same time using a plurality of sub-carriers at a reception time having a time lag due to a transfer delay, said receiver comprising:

receiving means for receiving said transmission signal wherein high priority symbols composed of high priority information bits of said high priority data and low priority symbols composed of low priority information bits of said low priority data are positioned alternately, said high priority symbols and said low priority symbols are respectively differential-modulated based on a differential phase between a symbol undergoing differential-modulation and one previous symbol, and high Priority sub-carriers whereon said high priority symbols are superimposed and said sub-carriers on which said low priority symbols are superimposed are positioned alternately;

signal conversion processing means for performing a Fourier transform on a reception signal received by said receiving means for converting said high priority symbols and said low priority symbols lined on a frequency axis into a reception symbol stream lined on a time axis;

first differential demodulating means for differential-demodulating said reception symbol stream for forming said reception symbol stream wherein a differential phase is removed;

demodulating means for decoding said high priority data based on a signal component of said high priority symbols of said reception symbol stream;

phase offset component detecting means for detecting a phase offset component from said high priority symbols of said reception symbol stream;

phase removing means for removing said phase offset component from said high priority symbols of said reception symbol stream, and for removing said phase offset component from said low priority symbols of said reception symbol stream; and second differential demodulating means for forming one composite symbol composing respective symbols, wherein no phase difference exists between a high priority symbol of said reception symbol stream and one previous low priority symbol by said phase removing means, by differential-demodulating said composite symbol by using an adjacent composite symbol and by demodulating a differential-demodulated composite symbol for decoding said low priority data.

17. The receiver according to claim 16, wherein said demodulating means detects a correlative value using said signal component of said high priority symbols of said reception symbol stream for decoding said high priority data from said high priority symbols.

18. The receiver according to claim 16, further comprising control means for calculating said time lag based on said phase offset component for transmission of said time lag to said transmitter.

19. The receiver according to claim 16, wherein said low priority data is predetermined message data, said high priority data is preamble data representing the existence and an attribute of said message data, said preamble data is decoded by said demodulating means for confirming said existence and said attribute of said message data, and said message data is decoded by said second differential demodulating means.

20. A receiving method for receiving a transmission signal transmitted from a transmitter that transmits high priority data and low priority data at a same time using a plurality of sub-carriers, at a reception time having a time lag due to a transfer delay, comprising the steps of:

receiving said transmission signal wherein high priority symbols composed of high priority information bits of said high priority data and low priority symbols composed of low priority information bits of said low priority data are positioned alternately, and each symbol of a differential symbol stream obtained by differential-modulating said high priority symbols based on a differential phase between a high priority symbol and one previous low priority symbol is assigned to a sub-carrier for alternatively positioning high priority sub-carriers whereon said high priority data is superimposed and low priority sub-carriers whereon said low priority data is superimposed;

performing a predetermined conversion precessing on a reception signal received for converting said reception signal into a reception symbol stream of said high priority symbols and said low priority symbols positioned alternately and aligned on a time axis;

differential-demodulating said reception symbol stream for forming said reception symbol stream wherein a differential phase is removed;

detecting a phase offset component from said high priority symbols of said reception symbol stream;

decoding said high priority data based on the signal component of said high priority symbols; and decoding said low priority data after said phase offset component is removed from said low priority data of said reception symbol stream.

21. The receiving method according to claim 20, further comprising the step of calculating said time lag based on said phase offset component for transmission of said time lag to said transmitter.

22. The receiving method according to claim 20, wherein said low priority data is predetermined message data, and said high priority data is preamble data representing an existence and an attribute of said message data; and said receiving method further comprises the steps of:

decoding said preamble data for confirming said existence and said attribute of said message data; and decoding said message data.

23. A receiving method for receiving a transmission signal transmitted from a transmitter that transmits high priority data and low priority data at a same time using a plurality of sub-carriers at a reception time having a time lag due to a transfer delay, comprising the steps of:

receiving said transmission signal wherein high priority symbols composed of high priority information bits of said high priority data and low priority symbols composed of low priority information bits of said low priority data are positioned alternately, and said high priority symbols and said low priority symbols are respectively differential-modulated based on a differential phase between a symbol undergoing differential-modulation and one previous symbol, and high priority sub-carriers whereon said high priority symbols are superimposed and said sub-carriers on which said low priority symbols are superimposed are positioned alternately;

performing the Fourier transform on a reception signal received for converting said high priority symbols and said low priority symbols lined on a frequency axis into a reception symbol stream lined on a time axis;

differential-demodulating said reception symbol stream for forming said reception symbol stream wherein a differential phase is removed;

decoding said high priority data based on a signal component of said reception high priority symbol of said symbol stream;

detecting a phase offset component from said high priority symbols of said reception symbol stream;

removing said phase offset component of said high priority symbol of said reception symbol stream;

removing said phase offset component from said low priority symbol of said reception symbol stream;

forming one composite symbol by composing respective symbols in a condition wherein no phase difference exists between a high priority symbol of said reception symbol stream and one previous low priority symbol;

differential-demodulating said composite symbol by using an adjacent composite symbol; and demodulating a differential-demodulating composite symbol for decoding said low priority data.

24. The receiving method according to claim 23, further comprising the step of detecting a correlative value using said signal component of said high priority symbols of said reception symbol stream for decoding said high priority data from said high priority symbols.

25. The receiving method according to claim 23, further comprising the step of calculating said time lag based on said phase offset component for transmission of said time lag to said transmitter.

26. The receiving method according to claim 23, wherein said low priority data is predetermined message data, and said high priority data is preamble data representing an existence and an attribute of said message data; and said receiving method further comprises the steps of:

decoding said preamble data for confirming said existence and said attribute of said message data; and decoding said message data.

27. A cellular radio communication system comprising:

a base station for each cell wherein a predetermined area is divided to a desired size; and a mobile station for radio-communicating with said base station within a cell where said mobile station exists; and wherein:

said mobile station transmits via a random access channel a transmission signal wherein preamble symbols composed of preamble information bits of preamble data and message symbols composed of message information bits of message data are positioned alternately, and each symbol of a differential symbol stream obtained by differential-modulating said preamble symbols based on a differential phase between a preamble symbol and one previous message symbol is assigned to a sub-carrier for alternately positioning preamble sub-carriers whereon preamble symbols are superimposed and message sub-carriers whereon said message symbols are superimposed; and said base station, when said transmission signal is received at a reception time having a time lag due to a transfer delay, performs a predetermined reception processing on received reception signal for obtaining a reception symbol stream formed of an alignment of said preamble symbols and said message symbols positioned alternately on a time axis, detects a phase offset component from said preamble symbols of said reception symbol stream wherein a differential phase is removed by differential-demodulating said reception symbol stream, decodes said preamble data based on a signal component of said preamble symbols, and decodes said message data after said phase offset component is removed from said message symbols of said reception symbol stream.

28. A cellular radio communication system comprising:

a base station for each cell wherein a predetermined area is divided to a desired size; and a mobile station for radio-communicating with said base station within a cell where said mobile station exists, wherein:

said base station transmits via an initial acquisition channel a transmission signal wherein message symbols composed of message information bits of message data and preamble symbols composed of preamble information bits of preamble data are positioned alternately, and each symbol of a differential symbol stream obtained by differential-modulating said preamble symbols based on a differential phase between a preamble symbol and one previous message symbol is assigned to a sub-carrier for alternately positioning preamble sub-carriers, wherein said preamble symbols are superimposed and message sub-carriers whereon said message symbols are superimposed; and said mobile station, when said transmission signal is received at a reception time having a time lag due a to transfer delay, performs a predetermined reception processing on a received reception signal for obtaining a reception symbol stream, wherein said preamble symbols and said message symbols positioned alternately on a time axis are aligned, detects a phase offset component from said preamble symbols of said reception symbol stream differential phase is removed by differential-demodulating said reception symbol stream, decodes said preamble data based on a signal component of said preamble symbols, and decodes said message data after said phase offset component is removed from said message symbols of said reception symbol stream.

* * * * *